(12) United States Patent
Zhao et al.

(10) Patent No.: US 12,192,847 B2
(45) Date of Patent: Jan. 7, 2025

(54) METHODS AND SYSTEMS FOR RECOMMENDING PICK-UP POINTS

(71) Applicant: BEIJING DIDI INFINITY TECHNOLOGY AND DEVELOPMENT CO., LTD., Beijing (CN)

(72) Inventors: Yichen Zhao, Beijing (CN); Qian Liu, Beijing (CN); Chao Shen, Beijing (CN); Minghui He, Beijing (CN); Jiantao Yang, Beijing (CN); Weihuan Shu, Beijing (CN); Li Ma, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 391 days.

(21) Appl. No.: 17/660,408

(22) Filed: Apr. 23, 2022

(65) Prior Publication Data
US 2022/0248170 A1    Aug. 4, 2022

Related U.S. Application Data

(63) Continuation of application No. PCT/CN2020/122966, filed on Oct. 22, 2020.

(30) Foreign Application Priority Data

Oct. 23, 2019 (CN) .......................... 201911012890.7
Oct. 23, 2019 (CN) ......................... 201911012937.X
(Continued)

(51) Int. Cl.
*H04W 4/021* (2018.01)
*G01C 21/00* (2006.01)
(Continued)

(52) U.S. Cl.
CPC ........ *H04W 4/021* (2013.01); *G01C 21/3885* (2020.08); *G06F 16/24578* (2019.01); *H04W 4/025* (2013.01)

(58) Field of Classification Search
CPC ............. H04W 4/021; G06F 16/24578; G01C 21/3885
See application file for complete search history.

(56) References Cited

U.S. PATENT DOCUMENTS

2013/0345958 A1   12/2013   Paek et al.
2014/0129132 A1    5/2014   Yoshizu
(Continued)

FOREIGN PATENT DOCUMENTS

CN   105677793 A   6/2016
CN   107403560 A   11/2017
(Continued)

OTHER PUBLICATIONS

International Search Report in PCT/CN2020/122966 mailed on Jan. 27, 2021, 6 pages.
(Continued)

*Primary Examiner* — Kevin Kim
(74) *Attorney, Agent, or Firm* — METIS IP LLC

(57) ABSTRACT

The present disclosure provides methods and systems for recommending pick-up points. The method may include obtaining information of a searched point of interest determined by a user; determining a first set of candidate pick-up points based at least on the information of the searched point of interest, the first set of candidate pick-up points including a plurality of candidate pick-up points; determining at least one recommended pick-up point through a preset algorithm based at least on the first set of candidate pick-up points, and displaying the at least one recommended pick-up point to the user.

20 Claims, 11 Drawing Sheets

(30) Foreign Application Priority Data

Dec. 3, 2019 (CN) .......................... 201911225778.1
Dec. 28, 2019 (CN) .......................... 201911400880.0

(51) Int. Cl.
G06F 16/2457 (2019.01)
H04W 4/02 (2018.01)

(56) References Cited

U.S. PATENT DOCUMENTS

| | | | |
|---|---|---|---|
| 2015/0219464 A1 | 8/2015 | Beaurepaire et al. | |
| 2017/0309170 A1 | 10/2017 | Wang | |
| 2018/0014161 A1 | 1/2018 | Warren et al. | |
| 2018/0040011 A1 | 2/2018 | Milton | |
| 2018/0189918 A1 | 7/2018 | Lu | |
| 2018/0268324 A1 | 9/2018 | Zhang et al. | |
| 2018/0340787 A1 | 11/2018 | Sheth et al. | |
| 2019/0063935 A1 | 2/2019 | Badalamenti et al. | |
| 2019/0114668 A1 | 4/2019 | Zhuo et al. | |
| 2019/0370702 A1 | 12/2019 | Li | |
| 2020/0041301 A1* | 2/2020 | Jalasutram | H04W 4/029 |
| 2021/0073728 A1 | 3/2021 | Yu et al. | |

FOREIGN PATENT DOCUMENTS

| | | | |
|---|---|---|---|
| CN | 107506421 A | 12/2017 | |
| CN | 107544990 A | 1/2018 | |
| CN | 108364498 A | 8/2018 | |
| CN | 108460471 A | 8/2018 | |
| CN | 108765933 A | 11/2018 | |
| CN | 109115237 A | 1/2019 | |
| CN | 109308537 A | 2/2019 | |
| CN | 109325185 A | 2/2019 | |
| CN | 109583607 A | 4/2019 | |
| CN | 109614557 A | 4/2019 | |
| CN | 109841054 A | 6/2019 | |
| CN | 109948068 A | 6/2019 | |
| CN | 110046218 A | 7/2019 | |
| CN | 110175779 A | 8/2019 | |
| CN | 110232832 A | 9/2019 | |
| WO | 2019205815 A1 | 10/2019 | |

OTHER PUBLICATIONS

Written Opinion in PCT/CN2020/122966 mailed on Jan. 27, 2021, 8 pages.

Zhang, Yuewei et al., Personalized Recommender Algorithm of Taxi Pick-Up Locations, Computer Systems & Applications, 26(6): 148-152, 2017.

Qu, Zhaowei et al., Urban Hotspot Travel Section Identification Method Based on Taxi GPS Large Data, Journal of Transportation Systems Engineering and Information Technology, 19(2): 238-246, 2019.

Han, Xiaofeng et al., Personalized point-of-interest recommendation in location-based social networks, Application Research of Computers, 36(5): 1464-1468, 2019.

Zhong, Qiuyan et al., Personalized Recommendation Method of Long-Distance Car Sharing Based on Social Network, Computer Applications and Software, 34(4): 265-271&315, 2017.

Shen, Bilong et al., Urban Activity Mining Framework for Ride Sharing Systems Based on Vehicular Social Networks, Networks and Spatial Economics, 18: 705-734, 2018.

* cited by examiner

METHODS AND SYSTEMS FOR RECOMMENDING PICK-UP POINTS

CROSS-REFERENCE TO RELATED APPLICATIONS

This application is a Continuation of International Application No. PCT/CN2020/122966 filed on Oct. 22, 2020, which claims priority of Chinese Patent Application No. 201911012890.7, filed on Oct. 23, 2019, Chinese Patent Application No. 201911012937.X, filed on Oct. 23, 2019, Chinese Patent Application No. 201911225778.1, filed on Dec. 3, 2019, and Chinese Patent Application No. 201911400880.0, filed on Dec. 28, 2019, the contents of which are hereby incorporated by reference.

TECHNICAL FIELD

The present application relates to the field of transportation services, and in particular, to methods and systems for recommending pick-up points.

BACKGROUND

With the rapid development of technology, it has become common for people to take taxi trips through online car-hailing service platforms. And with the rapid development of intelligent services, people's trips are also becoming more convenient and efficient. In order to enable service providers (e.g., drivers) to pick up service requesters (e.g., passengers) in a shorter time to improve efficiency, it is crucial to recommend suitable pick-up points for the service requesters.

Therefore, it is desirable to provide methods and systems for recommending pick-up points.

SUMMARY

An aspect of some embodiments of the present disclosure provides a method for recommending a pick-up point (PUP). The method may include obtaining information of a searched POI determined by a user; determining a first set of candidate PUPs based at least on the information of the searched POI, the first set of candidate PUPs including a plurality of candidate PUPs; determining at least one recommended PUP through a preset algorithm based at least on the first set of candidate PUPs, and displaying the at least one recommended PUP to the user.

In some embodiments, the searched POI may include one or more points of interest (POIs) selected by the user based on a set of recommended POIs. The determining a first set of candidate PUPs based at least on the information of the searched POI may include obtaining a positioning location of the user and historical behavior information of the user; determining a set of candidate POIs based on the positioning location of the user and the historical behavior information of the user, the set of candidate POIs including a plurality of candidate POIs; determining the set of recommended POIs based on the set of candidate POIs, the set of candidate POIs including at least one recommended POI; and determining the first set of candidate PUPs based at least on the information of the searched POI selected by the user from the set of recommended POIs.

In some embodiments, the determining a set of candidate POIs based on the positioning location of the user and the historical behavior information of the user may include determining a set of first POIs including one or more first POIs within a preset range of the positioning location, a spatial distance between each of the one or more first POIs with the positioning location of the user being less than a first preset distance threshold; determining, based on the historical behavior information of the user, a set of second POIs including one or more second POIs that are historically clicked and/or searched by the user; and determining the set of candidate POIs based on the set of first POIs and the set of second POIs.

In some embodiments, the determining the set of recommended POIs based on the set of candidate POIs may include obtaining first feature information of the plurality of candidate POIs; obtaining scoring values of the plurality of candidate POIs by scoring the plurality of candidate POIs based on the first feature information; obtaining a screened set of candidate POIs by screening the plurality of candidate POIs based on similarity degrees between the plurality of candidate POIs; and determining the set of recommended POIs based on a scoring value of each of one or more candidate POIs in the screened set of candidate POIs.

In some embodiments, the first feature information of a candidate POI may include at least one of a self-attribute feature of the candidate POI, a relationship feature between the candidate POI and the positioning position of the user, or a feature of a historical click rate of the candidate POI. The self-attribute feature of the candidate POI may include at least one of a type of the candidate POI, a count of candidate PUPs recalled by the candidate POI, or a hotness of the candidate POI. The relationship feature between the candidate POI and the positioning location of the user may include at least one of a distance feature or a feature whether to cross a road.

In some embodiments, the determining the set of recommended POIs based on a scoring value of each of one or more candidate POIs in the screened set of candidate POIs may include obtaining a sorting result by sorting the one or more candidate POIs in the screened set of candidate POIs based on the scoring value of each of the one or more candidate POIs; and determining the set of recommended POIs based on the sorting result.

In some embodiments, the determining at least one recommended PUP through a preset algorithm based at least on the first set of candidate PUPs may include determining a set of security PUPs based on the first set of candidate PUPs, the set of security PUPs including at least one security candidate PUP; and determining the at least one recommended PUP through the preset algorithm based on the set of security PUPs.

In some embodiments, the determining a set of security PUPs based on the first set of candidate PUPs may include obtaining information of one or more parking violation road sections; determining, based on the information of the one or more parking violation road sections, whether each of the plurality of candidate PUPs in the first set of candidate PUPs meets a preset security condition; and adding one or more candidate PUPs each of which meets the preset security condition to the set of security PUPs.

In some embodiments, the information of the one or more parking violation road sections may include at least one of information of a parking violation road section including a no-parking sign, information of a road section in a parking ticket, information of a parking violation road section acquired by a parking violation electronic eye, or information of a parking violation road section reported by the user.

In some embodiments, the preset security condition may include a condition that a parking risk value of the candidate PUP is less than a preset risk threshold. The parking risk value may be a ratio of a count of tickets in orders where the candidate PUP is a starting point to a total count of the orders within a first preset time threshold.

In some embodiments, the determining the at least one recommended PUP through the preset algorithm based on the set of security PUPs may include obtaining second feature information of the at least one candidate PUPs in the set of security PUPs; and determining the at least one recommended PUP through the preset algorithm based on the second feature information.

In some embodiments, the second feature information of the one or more candidate PUPs may include at least one of a relationship feature between the candidate PUP and the searched POI, a relationship feature between the candidate PUP and a positioning location of the user, a self-attribute feature of the searched POI, or a self-attribute feature of the candidate PUP.

In some embodiments, the preset algorithm may include a trained PUP recommendation model.

In some embodiments, the PUP recommendation model may include a Lambdamart model.

In some embodiments, the trained PUP recommendation model may be obtained according to a following process. The following process may include obtaining data of a plurality of historical orders; obtaining, from the data of the plurality of historical orders, a billing point and a real PUP of each historical order in the plurality of historical orders; screening the data of the plurality of historical orders based on a spatial position relationship between the billing point and the real PUP of each historical order; designating the screened data as training samples; and obtaining the trained PUP recommendation model by training a model based on the training samples.

In some embodiments, the obtaining a billing point and a real PUP of each historical order from the data of the plurality of historical orders may include obtaining a motion trajectory of a service provider terminal and a motion trajectory of a service requester terminal in each historical order; determining, based on the motion trajectory of the service provider terminal, at least one stopping point of the service provider terminal; determining, based on the motion trajectory of the service requester terminal, at least one stopping point of the service requester terminal; and determining the real PUP based on the at least one stopping point of the service provider terminal and the at least one stopping point of the service requester terminal.

In some embodiments, the determining, based on the motion trajectory of the service requester terminal, at least one stopping point of the service requester terminal may include determining, based on the motion trajectory of the service requester terminal, whether a dwell time of the service requester terminal at a motion trajectory point is larger than a second preset time threshold; in response to that the dwell time of the service requester terminal at the motion trajectory point is larger than the second preset time threshold, determining whether motion trajectory points within the second preset time threshold are available to be clustered; and in response to that the motion trajectory points within the second preset time threshold are available to be clustered, determining the at least one stopping point of the service requester terminal based on the clustered motion trajectory points of the service requester terminal.

In some embodiments, the determining the real PUP based on the at least one stopping point of the service provider terminal and the at least one stopping point of the service requester terminal may include obtaining a plurality of intersection points between the motion trajectory points of the service provider terminal and motion trajectory points of the service requester terminal; determining a first distance between one intersection point among the plurality of intersection points and the at least one stopping point of the service provider terminal, and determining a second distance between the intersection point and the at least one stopping point of the service requester terminal; and determining an intersection point of the plurality of intersection points to be the real PUP, the first distance and the second distance corresponding to the intersection point being minimum.

In some embodiments, the screening the data of the plurality of historical orders based on a spatial position relationship between the billing point and the real PUP in each historical order may include determining a distance between the billing point and the real PUP in each historical order; in response to the distance between the billing point and the real PUP in the historical order is less than or equal to a second preset distance threshold, determining whether the billing point and the real PUP in the historical order are located in a same road section; and in response to that the billing point and the real PUP in the historical order are located in the same road section, determining that the historical order passes the screening.

In some embodiments, the designating the screened data as training samples, and obtaining the trained PUP recommendation model by training a model based on the training samples may include, for each historical order that passes the screening, obtaining a searched POI and a PUP in the historical order; determining a feature of the searched POI and a feature of the PUP in the historical order; determining a label of the historical order based on a spatial position relationship between a recommended PUP and the real PUP of the historical order; and obtaining the trained PUP recommendation model by training, based on the feature of the searched POI and the feature of the PUP in the historical order and the label of the historical order, an initial machine learning model.

In some embodiments, the determining at least one recommended PUP through a preset algorithm based at least on the first set of candidate PUPs may include determining second feature information of at least one candidate PUP in the first set of candidate PUPs; determining a scoring value of each candidate PUP by scoring each candidate PUP in the at least one candidate PUP through the preset algorithm based at least on the second feature information of the at least one candidate PUP; and determining the at least one recommended PUP based on the scoring value of each candidate PUP in the at least one candidate PUP.

Another aspect of some embodiments of the present disclosure provides a system for recommending a pick-up point (PUP). The system may include an obtaining module, a candidate PUP determination module, and a recommended PUP determination module. The obtaining module may be configured to obtain information of a searched point of interest (POI) determined by a user. The candidate PUP determination module may be configured to determine a first set of candidate PUPs based at least on the information of the searched POI, the first set of candidate PUPs including a plurality of candidate PUPs. The recommended PUP determination module may be configured to determine at least one recommended PUP through a preset algorithm based at least on the first set of candidate PUPs, and display the at least one recommended PUP to the user.

Still another aspect of some embodiments of the present disclosure provides a computer readable storage medium, comprising computer instructions that, when executed by at least one processor, direct the at least one processor to perform a method for recommending a pick-up point (PUP). The method may include obtaining information of a searched point of interest (POI) determined by a user; determining a first set of candidate PUPs based at least on the information of the searched POI, the first set of candidate PUPs including a plurality of candidate PUPs; determining at least one recommended PUP through a preset algorithm based at least on the first set of candidate PUPs, and displaying the at least one recommended PUP to the user.

Still another aspect of some embodiments of the present disclosure provides a system for recommending a pick-up point (PUP). The system may include at least one storage medium including a set of instructions; at least one processor in communication with the at least one storage medium, wherein executing the set of instructions, the at least one processor is directed to perform operations including obtaining information of a searched point of interest (POI) determined by a user; determining a first set of candidate PUPs based at least on the information of the searched POI, the first set of candidate PUPs including a plurality of candidate PUPs; determining at least one recommended PUP through a preset algorithm based at least on the first set of candidate PUPs, and displaying the at least one recommended PUP to the user.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
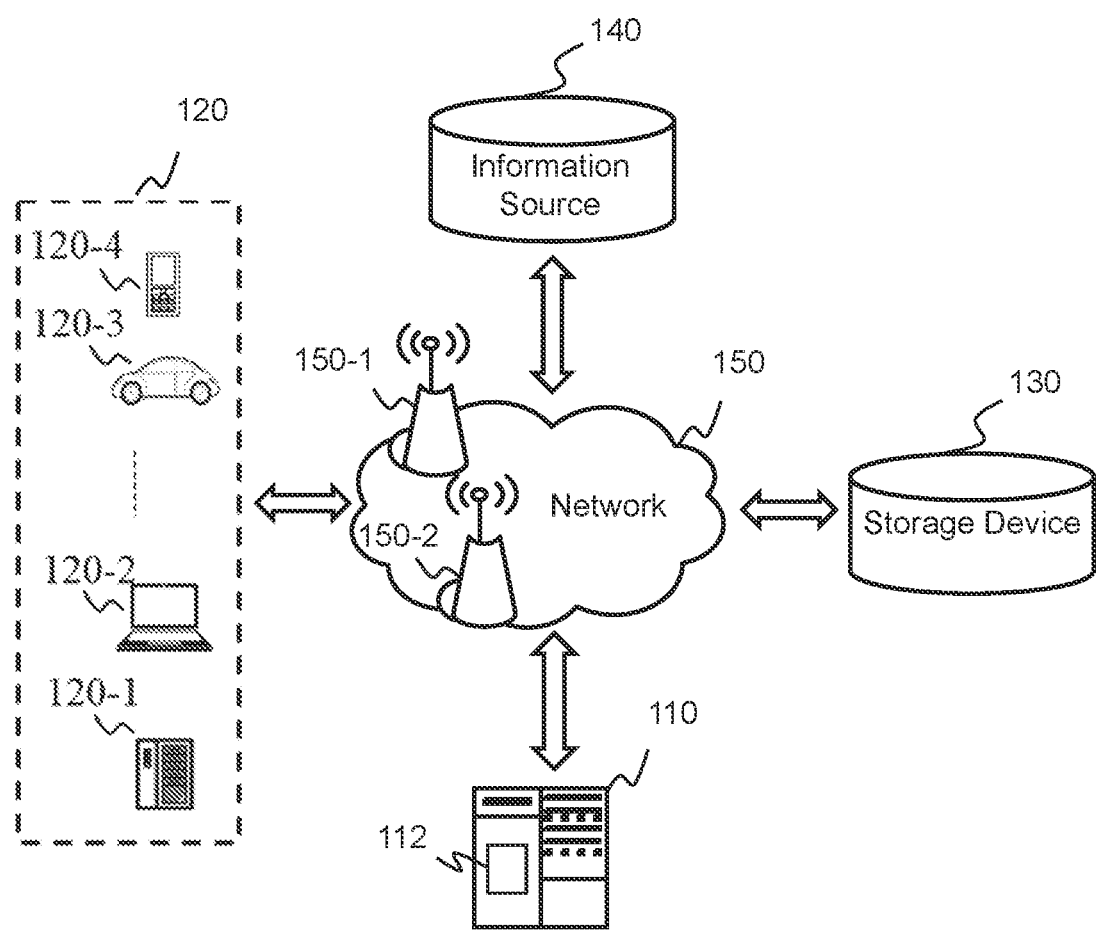
FIG. 1 is a schematic diagram illustrating an exemplary pick-up point recommendation system according to some embodiments of the present disclosure.

In order to describe technical solutions of the embodiments of the present disclosure more clearly, the following description may briefly introduce the accompanying drawings that need to be used in some embodiments of the present disclosure. Obviously, the accompanying drawings in the following description are only examples or embodiments of the present disclosure. For those skilled in the art, the present disclosure may be applied to other similar scenarios based on the accompanying drawings without creative effort. Same symbols in the figures may represent same structures or operations unless the context clearly indicates otherwise.

It will be understood that the term "system," "engine," "unit," and/or "module" used herein are one method to distinguish different components, elements, parts, sections, or assembly of different levels in ascending order. However, the terms may be displaced by another expression if they achieve the same purpose.

As used herein, the singular forms "a," "an," and "the" may be intended to include the plural forms as well, unless the context clearly indicates otherwise. It will be further understood that the terms "comprise" and "include" when used in this disclosure, specify the presence of stated operations and/or elements, but do not preclude the presence or addition of one or more other operations and/or elements thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Embodiments of the present disclosure may be applied to different transportation service systems including land transportation, sea transportation, air transportation, space transportation, or the like, or any combination thereof. A vehicle of the transportation systems may include a rickshaw, a travel tool, taxi, an automobile (e.g., a small car, a bus, a large transport vehicle, etc.), a rail transportation (e.g., a train, a bullet train, high-speed rail, and subway, etc.), a ship, an airplane, a spaceship, a satellite, a hot-air balloon, a driverless vehicle, or the like, or any combination thereof. The application scenarios of different embodiments of the present disclosure may include transportation, warehousing and logistics, agricultural operation systems, urban transit systems, commercial operation vehicles, or the like, or any combination thereof. It should be understood that application scenarios of the system and method disclosed herein are only some examples or embodiments. Those having ordinary skills in the art, without further creative efforts, may apply these drawings to other application scenarios, for example, other similar servers.

The application scenarios of the system or method of the present disclosure may include a web page, a plug-in and/or an extension of a browser, a client terminal, a custom system, an internal analysis system, an artificial intelligence robot, or the like, or any combination thereof. It should be understood that application scenarios of the system and method disclosed herein are only some examples or embodiments. Those having ordinary skills in the art, without further creative efforts, may apply these drawings to other application scenarios, for example, other similar servers.

The term "pick-up point (PUP)" in the present disclosure may refer to a location where a driver begins to provide a service initiated by a user. For example, in an online car-hailing service, a driver may pick up a user who initiates a service at a school entrance and take the user to a destination of the user. The school entrance may be the PUP for the service. The term "candidate PUP" in the present disclosure may refer to a location including a potential location where the driver begins to provide the service initiated by a target user terminal in a region and/or a historical PUP in the region.

The terms "passenger," "passenger terminal," "rider," "user," "customer," "requester," "service requester," "consumer," "consuming party," "usage requester," etc., in the present disclosure are used interchangeably to refer to an individual, an entity, or a tool that may request or order a service. Also, the terms "driver," "driver terminal," "provider," "supplier," "service provider," "servicer," and "service party" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning systems may be used interchangeably in the present disclosure.

FIG. 1 is a schematic diagram illustrating an exemplary pick-up point (PUP) recommendation system according to some embodiments of the present disclosure.

In some embodiments, a PUP recommendation system 100 may determine a recommended PUP based on information of a searched point of interest (POI) determined by a user, and display the recommended PUP to the user. The PUP recommendation system 100 may include an online service platform for Internet services. For example, the PUP recommendation system 100 may include an online transportation service platform for transportation services. In some embodiments, the PUP recommendation system 100 may be applied to online car-hailing services, such as taxi calls, express car calls, special car calls, minibus calls, carpooling, bus services, driver hiring, pick-up services, etc. For example, the PUP recommendation system 100 may include a platform for providing services to a transportation service. In some embodiments, the PUP recommendation service may include any online service, such as booking, shopping, or the like, or any combination thereof. The PUP recommendation system 100 may include a server 110, one or more user terminal 120, a storage device 130, an information source 140, and a network 150. The server 110 may include a processing device 112.

The server 110 may process data and/or information from at least one component of the PUP recommendation system 100. The server 110 may communicate with the user terminal 120 to provide various functions of online services. For example, the server 110 may receive a service request from the user terminal 120, and process the service request to recommend a PUP to the user terminal 120. As another example, the server 110 may send a received service request initiated by a passenger to the user terminal 120, so that the driver provides a service to the passenger.

In some embodiments, the server 110 may be a single server or a server group. The server group may be centralized or distributed. For example, the server 110 may be a distributed system. In some embodiments, the server 110 may be local or remote. For example, the server 110 may access information and/or data stored in the storage device 130, the user terminal 120, etc., via the network 150. As another example, the server 110 may be directly connected to the storage device 130, the user terminal 120, etc., to access the stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include the processing device 112. The processing device 112 may process information and/or data related to the service request to perform one or more functions described in the present disclosure. For example, the processing device 112 may determine whether a candidate PUP is a security PUP, and determine the recommended PUP based on a set of security PUPs. In some embodiments, the processing device 112 may include one or more processors (e.g., a single-core processor or a multi-core processor). Merely by way of example, the processing device 112 may include one or more hardware processors, such as a central processing unit (CPU), an application specific integrated circuit (ASIC), an application specific instruction processor (ASIP), a graphics processor (GPU), a physical processor (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

The user terminal 120 may include a person, a tool, or other entity associated with a service order, such as a requester of the service order. The user terminal 120 may communicate with the server 110 via the network 150. In some embodiments, a user of the user terminal 120 may include an owner of the device. In some embodiments, the user of the user terminal 120 may include other people other than the owner. For example, in an online car-hailing service, the user of the user terminal 120 may be a passenger, or a person who is a relative or friend of the passenger who helps the passenger to place an order. In some embodiments, the user terminal 120 may include a passenger.

In some embodiments, the user terminal 120 may include a desktop computer 120-1, a laptop computer 120-2, an in-vehicle built-in device 120-3, a mobile device 120-4, or the like, or any combination thereof. The user terminal 120 may send a service request online. For example, the user terminal 120 may send an online car-hailing order based on a current location and a destination. In some embodiments, the in-vehicle built-in device 120-3 may include an in-vehicle computer, a vehicle head up display (HUD), an on-board diagnostic (OBD), or the like, or any combination thereof. In some embodiments, the mobile device 120-4 may include a smart home device, a wearable device, a smart mobile device, a virtual reality device, an augmented reality device, or the like, or any combination thereof. In some embodiments, the smart home device may include a smart lighting device, a control device of a smart electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc.

In some embodiments, the user terminal 120 may send information of the service order to one or more devices (components) in the PUP recommendation system 100. For example, the user terminal 120 may send the service request to the server 110 for processing. In some embodiments, the user terminal 120 may be a device with a positioning technique to determine a location of the user and/or the user terminal 120, and send the location to one or more devices (e.g., the server 110) in the PUP recommendation system 100. In some embodiments, the user terminal 120 may also include one or more of the above similar devices. For example, the processing device 112 may be a portion of the user terminal 120, and the user terminal 120 may implement one or more functions of the PUP recommendation described in some embodiments of the present disclosure through the processing device 112.

The storage device 130 may store data and/or instructions. In some embodiments, the storage device 130 may store data obtained from the user terminal 120. In some embodiments, the storage device 130 may store data and/or instructions that the server 110 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more components (e.g., the server 110, the user terminal 120, etc.) in the PUP recommendation system 100. One or more components in the PUP recommendation system 100 may access the data or instructions stored in the storage device 130 via the network 150. In some embodiments, the storage device 130 may be directly connected to or communicate with one or more components (e.g., the server 110, the user terminal 120, etc.) in the PUP recommendation system 100. In some embodiments, the storage device 130 may be a portion of the server 110.

The information source 140 may include a source that provides other information for the PUP recommendation system 100. The information source 140 may be used to provide information related to the service, such as weather conditions, traffic information, time type information, information of laws and regulations, news events, life information, life guide information, etc. The information source 140 may be in the form of a single central server, multiple servers connected via the network, multiple personal devices, etc. When the information source 140 is implemented using multiple personal devices, the personal devices may generate content (e.g., as referred to as the "user-generated content"), for example, by uploading text, voice, images, video, etc., to a cloud server. The information source 140 may be generated by the multiple personal devices and the cloud server.

The network 150 may facilitate exchange of information and/or data. In some embodiments, the one or more components (e.g., the server 110, the user terminal 120, the storage device 130, etc.) of the PUP recommendation system 100 may send information and/or data to other components of the PUP recommendation system 100 via the network 150. For example, the server 110 may acquire/obtain a request from the user terminal 120 via the network 150. In some embodiments, the network 150 may be any type of wired or wireless network, or a combination thereof. For example, the network 150 may include a cable network, a wired network, an optical fiber network, a telecommunication network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points 150-1, 150-2, . . . , through which one or more components of the PUP recommendation system 100 may be connected to the network 150 to exchange data and/or information.

In some embodiments, the PUP recommendation system 100 may also include a navigation system. The navigation system may determine information related to a subject, such as information of one or more of the service requester terminal, the service provider terminal, the vehicle, or the like. In some embodiments, the navigation system may include a global positioning system (GPS), a global navigation satellite system (GLONASS), a compass navigation system (COMPASS), a beidou navigation satellite system, a Galileo positioning system, a quasi-zenith satellite system (QZSS), or the like, or any combination thereof. The information may include a location, a height, a speed, an acceleration, a current time, or the like, or any combination thereof. The navigation system may include one or more satellites. The one or more satellites may determine the above information independently or jointly. The satellite navigation system may send the above information to the network 150, the user terminal 120, or the server 110 via a wireless connection.

One of ordinary skill in the art would understand that when an element of the PUP recommendation system 100 performs, the element may perform through electrical signals (e.g., a current) and/or electromagnetic signals. For example, when a service requester terminal (e.g., the user terminal 120) sends out a service request to the server 110, a processor of the service requester terminal may generate electrical signals encoding the request. The processor of the service requester terminal may then send the electrical signals to an output port. If the service requester terminal communicates with the server 110 via a wired network, the output port may be physically connected to a cable, which further transmits the electrical signal to an input port of the server 110. If the service requester terminal communicates with the server 110 via a wireless network, the output port of the service requester terminal may be one or more antennas, which convert the electrical signal to an electromagnetic signal. Similarly, a service provider terminal (e.g., the user terminal 120) may receive an instruction and/or service request from the server 110 via electrical signal or electromagnet signals. Within an electronic device, such as the service requester terminal, the service provider terminal, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

It should be noted that the description of the PUP recommendation system 100 is merely for example and illustration, and not intended to limit the scope of the present disclosure. For those skilled in the art, various variations or modifications of the PUP recommendation system 100 may be made under the teachings of the present disclosure. However, those variations and modifications do not depart from the scope of the present disclosure.

Figure 2:
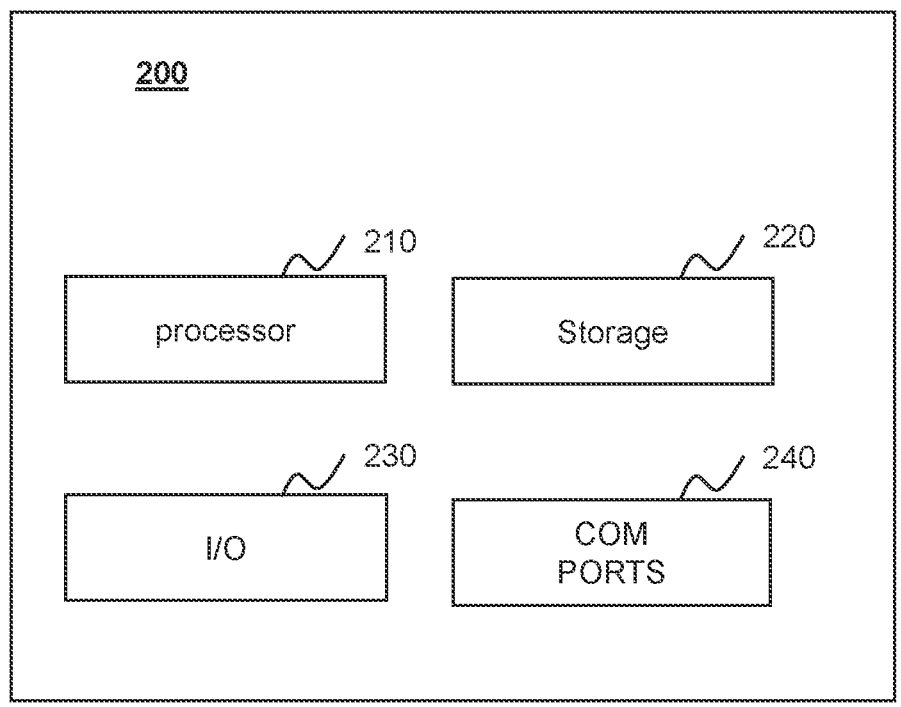
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure.

The computing device may be a computer, such as the server 110 in FIG. 1 and/or a computer with specific functions, configured to implement any particular system according to some embodiments of the present disclosure. Computing device 200 may be configured to implement any components that perform one or more functions disclosed in the present disclosure. For example, the server 110 may be implemented in hardware devices, software programs, firmware, or any combination thereof of a computer like the computing device 200. For brevity, FIG. 2 depicts only one computing device. In some embodiments, the functions of the computing device, providing functions that route planning may require, may be implemented by a group of similar platforms in a distributed mode to disperse the processing load of the system. In some embodiments, the computing device 200 may include a processor 210, a storage 220, an input/output (I/O) 230, and a communication port 240.

The processor 210 may execute computing instructions (program codes) and perform the functions of the processing device described in the present disclosure. The computing instructions may include programs, objects, components, data structures, procedures, modules, functions, etc. In some embodiments, the processor 210 may include one or more hardware processors, such as a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a digital signal processor (DSP), a field programmable gate array (FPGA), an advanced RISC machine (ARM), a programmable logic device (PLD), any circuits and processors that can perform one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the processing device 112, the user terminal 120, the storage device 130, and/or any other component of the PUP recommendation system 100. In some embodiments, the storage 220 may include a mass storage device, a removable storage device, a volatile read-and-write memory, a read-only memory (ROM), or the like, or any combination thereof. Exemplary mass storage may include a magnetic disk, an optical disk, a solid-state disk, a mobile disk, etc. Exemplary removable storage may include a flash drive, a floppy disk, an optical disk, a memory card, a zip disk, a magnetic tape, etc. Exemplary volatile read-and-write memory may include a random access memory (RAM). In some embodiments, the storage 220 may store one or more programs and/or instructions to perform exemplary methods described in the present disclosure.

The I/O 230 may input and/or output signals, data, information, etc. In some embodiments, the I/O 230 may enable user interaction with the processing device 112. In some embodiments, the I/O 230 may include an input device and an output device. Exemplary input devices may include a keyboard, a mouse, a touch screen, a microphone, or the like, or any combination thereof. Exemplary output devices may include a display device, a loudspeaker, a printer, a projector, or the like, or any combination thereof. Exemplary display devices may include a liquid crystal display (LCD), a light-emitting diode (LED)-based display, a flat panel display, a curved screen, a television device, a cathode ray tube (CRT), or the like, or any combination thereof.

The communication port 240 may be connected with a network (e.g., the network 150) to facilitate data communications. The communication port 240 may establish connections between the processing device 112 and the user terminal 120, the storage device 130, and/or the information resource 140. The connection may be a wired connection, a wireless connection, or a combination of both that enables data transmission and reception.

Figure 3:
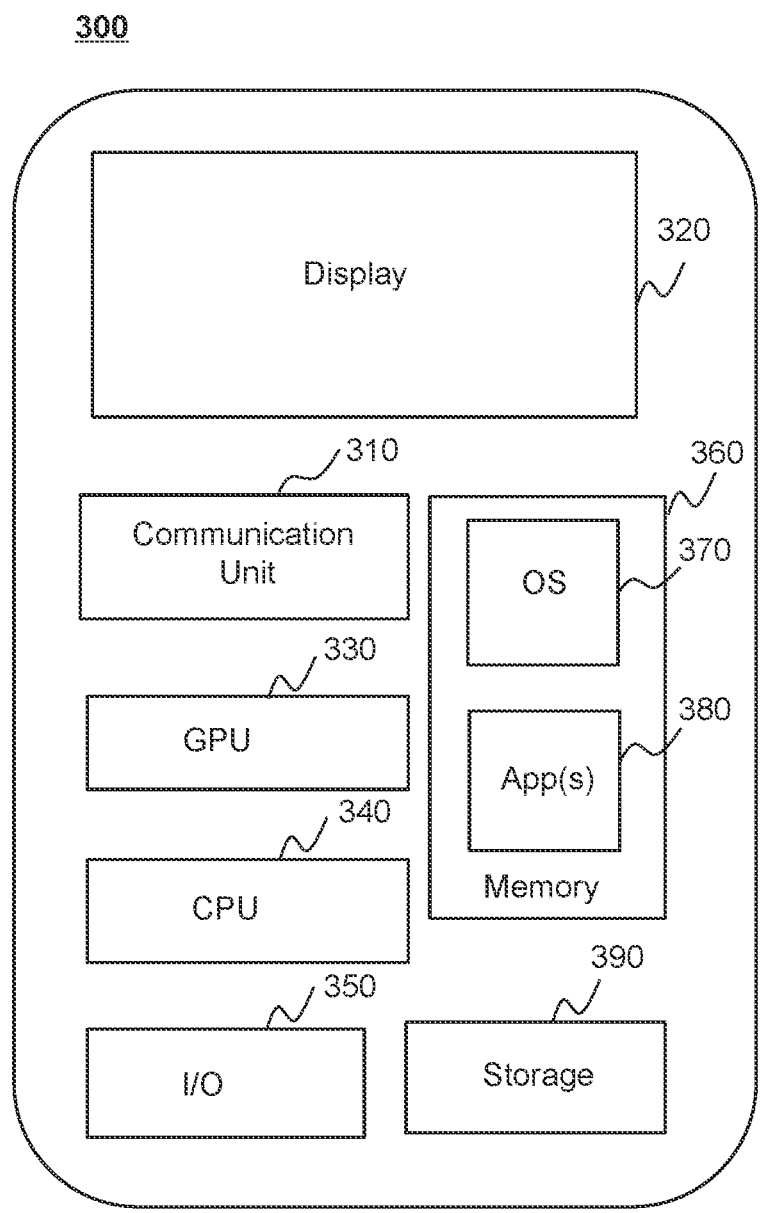
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure.

In some embodiments, the user terminal 120 may be implemented by a mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android, Windows Phone™, etc.) and one or more applications (APP(s)) 380 may be loaded into the memory 360 from the storage 390 in order to be executed by the CPU 340. The applications 380 may include a browser or any other suitable mobile apps for receiving and rendering information relating to image processing or other information from the processing device 112. User interactions with the information stream may be achieved via the I/O 350 and provided to the processing device 112 and/or other components of the PUP recommendation system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed.

Figure 4:
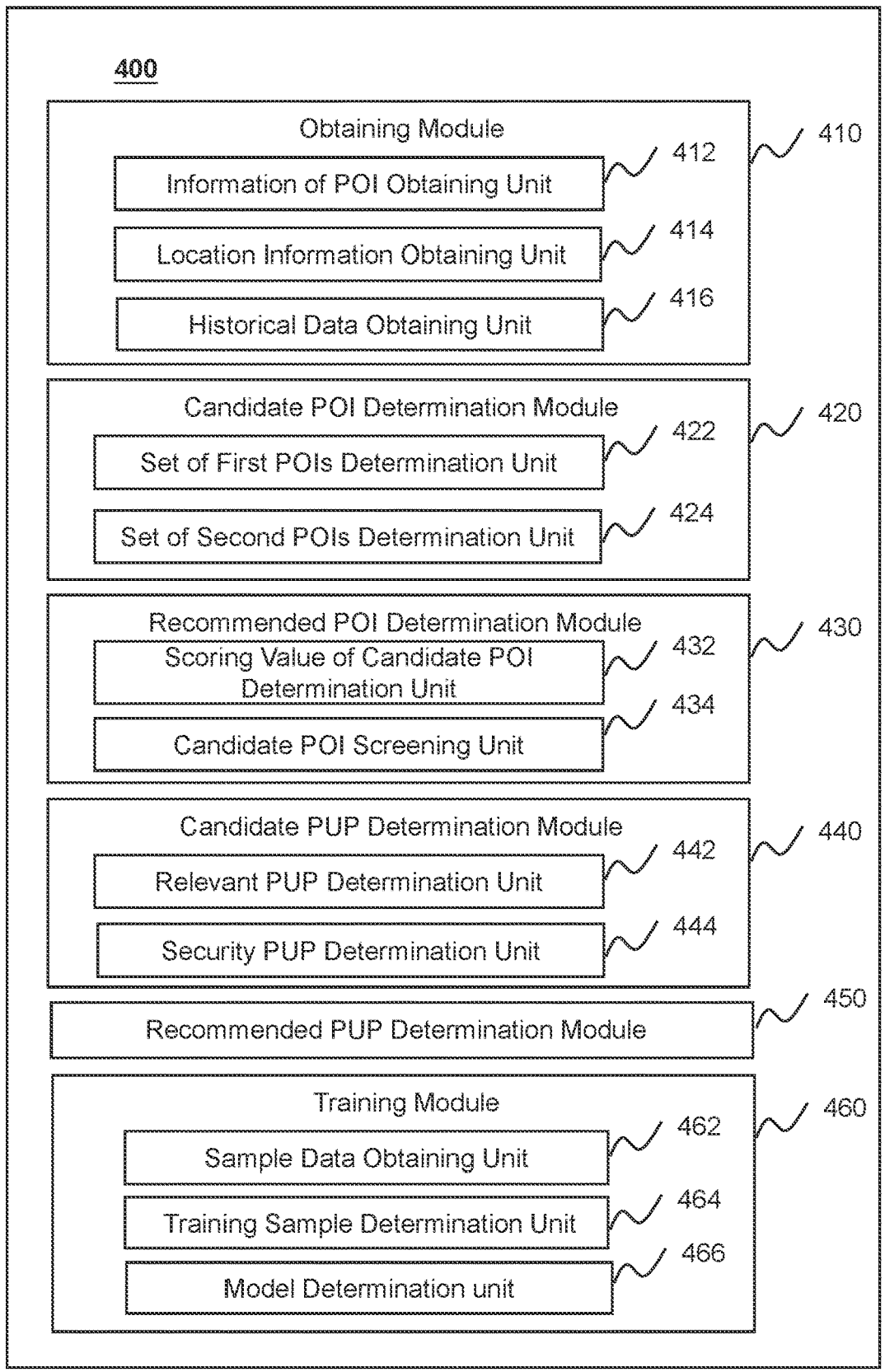
FIG. 4 is a block diagram illustrating an exemplary pick-up point recommendation system according to some embodiments of the present disclosure.

FIG. 4 is a block diagram illustrating an exemplary pick-up point (PUP) recommendation system according to some embodiments of the present disclosure.

As shown in FIG. 4, in some embodiments, a PUP recommendation system 400 may include an obtaining module 410, a candidate point of interest (POI) determination module 420, a recommended POI determination module 430, a candidate PUP determination module 440, a recommended PUP determination module 450, and a training module 460. These modules may be at least a portion of a hardware circuit of the processing device 112. These modules may also be implemented as applications or instructions read or executed by the processing device 112. In addition, these modules may be any combination of hardware circuits and applications/instructions. For example, when the processing device 112 performs the application/instruction, these modules may be a portion of the processing device 112.

The obtaining module 410 may obtain information related to a service request from one or more components (e.g., the user terminal 120, the storage device 130, etc.) of the system 100. For example, the obtaining module 410 may obtain location information (e.g., a searched POI, a user positioning position, a start pointing, an ending point (i.e., a destination), etc.) of a current order, and/or information (e.g., a searched keyword, a historical order, a historical behavior, etc.) input by a user. In some embodiments, the obtaining module 410 may at least include an information of POI obtaining unit 412, a location information obtaining unit 414, and a historical data obtaining unit 416, etc.

In some embodiments, the information of POI obtaining unit 412 may be configured to obtain information of a POI determined by the user. For example, the information of POI obtaining unit 412 may obtain information of the searched POI selected by the user based on a set of recommended POIs, information of the searched POI input by handwriting, pronunciation, speech, etc., or information of the searched POI determined by the user by dragging a map pin. In some embodiments, the information of the searched POI may include location information of historical PUPs, information of historical search POIs, positioning information of historical user terminals, etc., based on the historical data determined by the user. In some embodiments, the search points may include a location of a preset PUP when the user sends the service request, a searched keyword related to the POI input by the user, etc., which is not limited herein.

In some embodiments, the information of POI obtaining unit 412 may send the information of the POI determined by the user to other units and/or modules of the processing device 112 and/or one or more components of the system 100 for further processing. For example, the information of POI obtaining unit 412 may send the information of the POI determined by the user to the candidate PUP determination module 440 for further processing. As another example, the information of POI obtaining unit 412 may send the information of the POI determined by the user to the storage device 130 for storage.

The location information obtaining unit 414 may be configured to obtain the location information of the user terminal (user). For instance, the location information of the user may reflect a current location of the user. In some embodiments, the location information of the user may also include administrative region information, business district information, street information, or the like, or any combination thereof. In some embodiments, the location information of the user terminal may include a positioning position obtained by a positioning system built in the user terminal. In some embodiments, the location information of the user terminal may include latitude and longitude coordinates of the user terminal, geocoding, etc. In some embodiments, the location information obtaining unit 414 may be configured to obtain other position information such as the starting point, a historical starting point, a candidate PUP, a recommended PUP, a POI, etc.

The historical data obtaining unit 416 may be configured to obtain information of historical data. For example, the historical data obtaining unit 416 may be configured to obtain historical behavior information of the user. As another example, the historical data obtaining unit 416 may obtain data of historical orders and/or a billing point and a real PUP in each historical order from one or more components (e.g., the user terminal 120, the storage device 130, etc.) in the system 100. For example, the processing device 112 may obtain and/or process the data of the historical orders of the user and stored the data in the storage device 130. The historical data obtaining unit 416 may obtain a user identification (ID) that can uniquely determine user identity information, and further retrieve a historical order in the storage device 130 through the user ID to obtain the historical behavior information of the user ID. In some embodiments, the historical behavior information may be configured to obtain preference or habits (e.g., the searched POI, the PUP, features thereof) of the user, and further configured to determine a recommended POI and/or a recommended PUP. In some embodiments, the data of the historical orders may include information associated with historical carhailing orders, such as the searched POIs, positioning locations of the user, candidate PUPs, recommended PUPs, real PUPs, billing points, trajectories of the orders, destinations, historical departure time, user credit, historical rating, or the like, or any combination thereof. In some embodiments, the historical data obtaining unit 416 may send the obtained information of historical data to other units and/or modules of the processing device 112 and/or one or more components of the system 100 for further processing. For example, the historical data obtaining unit 416 may send the obtained historical behavior information of the user to the candidate POI determination module 420 and/or the candidate PUP determination module 440 for further processing.

In some embodiments, the obtaining module 410 may be configured to obtain order information of the current order (service request). For example, location information (e.g., a location of the searched POI, a location of an order initiator, a location of the start point, a location of the end point, etc.) of the current order may be obtained. In some embodiments, the obtaining module 410 may be configured to obtain information of one or more parking violation road sections, etc.

The candidate POI determination module 420 may be configured to determine one or more candidate POIs. In some embodiments, the candidate POIs may include a location related to the searched keyword or the positioning position of the user. For example, the candidate POI may include information such as a name, a category (e.g., a point region, a face region, etc.), latitude and latitude coordinates, etc. In some embodiments, the candidate POI determination module 420 may determine a plurality of candidate POIs based on the positioning location of the user (i.e., the positioning location of the user terminal), the searched keyword input by the user, the historical behavior information of the user, or the like, or any combination thereof.

In some embodiments, the candidate POI determination module 420 may further at least include a set of first POIs determination unit (or a high-hotness POI determination unit) 422 and a set of second POIs determination unit (or a historical searched POI determination unit) 424.

In some embodiments, the set of first POIs determination unit 422 may be configured to determine at least one first POI related to the positioning location of the user or the searched keyword. For example, the set of first POIs determination unit 422 may determine at least one POI within a preset range of the positioning location based on the positioning location of the user. In some embodiments, the set of first POIs determination unit 422 may determine the set of first POIs based on the POIs within the preset range of the user positioning location. For example, the set of first POIs determination unit 422 may determine the set of first POIs including one or more first POIs within the preset range of the positioning location, wherein a spatial distance between each of the one or more first POIs with the positioning location of the user is less than a first preset distance threshold. As another example, the set of first POIs determination unit 422 may add one or more POIs within the preset range each of whose hotness value is greater than a preset threshold to the set of first POI based on hotness values of the POIs, or sort POIs based on hotness values of the POIs and add first one or more POIs to the set of first POI. The set of second POIs determination unit 424 may be configured to determine at least one second POI related to the historical behavior information of the user. For example, the set of second POIs determination unit 424 may determine, based on the historical behavior information of the user, the set of second POIs including one or more second POIs that are historically clicked and/or searched by the user.

In some embodiments, the candidate POI determination module 420 may determine the set of candidate POIs based on the set of first POIs and the set of second POIs. For example, the candidate POI determination module 420 may determine a union or intersection of the set of first POIs and the set of second POIs as the set of candidate POIs. As another example, the candidate POI determination module 420 may obtain information of the historically searched POI of the user, determine at least one historically searched POI (i.e., the second POI) in the set of second POIs as the candidate POI based on the positioning location, a time, and/or a click rate of the historically searched POI of the user, and add the at least one historically searched POI to the set of candidate POIs. Still another example, the candidate POI determination module 420 may determine at least one first POI as the candidate POI based on a hotness of each POI in the set of first POIs and/or a spatial distance between each POI and the positioning location, and add the at least one first POI to the set of candidate POIs.

In some embodiments, the candidate POI determination module 420 may determine the set of candidate POIs based on a searched keyword input by the user. For example, the candidate POI determination module 420 may retrieve, based on a keyword matching technique, one or more POIs each of whose name is the same as or similar to the searched keyword as the candidate POI, and add the one or more POIs to the set of candidate POIs. In some embodiments, the information of the POI may be stored in the storage device 130. Merely by way of example, the candidate POI determination module 420 may retrieve one or more POIs with a relatively high text similarity degree as the candidate POI by determining a text similarity degree between a name of each POI stored in the storage device 130 and the searched keyword. For example, the candidate POI determination module 420 may select top n (e.g., 10, 15, 20, 30, etc.) POIs with the text similarity degree as the candidate POI. As another example, the candidate POI determination module 420 may select one or more POIs each of whose text similarity degree is larger than a certain threshold (e.g., 60%, 80%, etc.) as the candidate POI.

In some embodiments, the manner of determining the set of candidate POIs based on the searched keyword may also be any suitable manner in the prior art. For example, the candidate POI determination module 420 may determine the set of candidate POIs based on a prefix, a core word, a phrase, etc., of the searched keyword. As another example, the candidate POI determination module 420 may determine the candidate POIs based on a voice, a semantic, etc., of the searched keyword. In some embodiments, the searched keyword may be analyzed, rewritten, corrected, etc., before determining the set of candidate POIs based on the searched keyword.

The recommended POI determination module 430 may be configured to determine at least one recommended POI from the plurality of candidate POIs. For example, the recommended POI determination module 430 may determine the at least one recommended POIs from the plurality of candidate POIs by inputting features of the plurality of candidate POIs in the set of candidate POIs. In some embodiments, the recommended POI determination module 430 may further at least include a scoring value of candidate POI determination unit 432 and a candidate POI screening unit 434.

The scoring value of candidate POI determination unit 432 may be configured to determine a likelihood scoring value (a similarity scoring value) of each candidate POI in the set of candidate POIs. Merely by way of example, the scoring value of candidate POI determination unit 432 may obtain first feature information of each candidate POI in the set of candidate POIs, and determine the likelihood scoring value of each candidate POI based on the first feature information. For example, the first feature information of each candidate point may be input to a POI recommendation model, and the candidate POI may be scored by the POI recommended model.

The candidate POI screening unit 434 may be configured to screen the candidate POIs. For example, the candidate POI screening unit 434 may be configured to screen the candidate POIs based on a similarity degree of any two candidate POIs in the set of candidate POIs. In some embodiments, the candidate POI screening unit 434 may determine the similarity degree of any two candidate POIs points based on a name similarity degree of candidate POIs, a coordinate similarity degree of candidate POIs, and/or an address similarity degree of candidate POIs.

In some embodiments, the recommended POI determination module 430 may also include a similarity degree of candidate POI determination unit and a recommended POI determination unit. The similarity degree of candidate POI determination unit may be configured to determine the similarity degree of any two candidate POIs in the set of candidate POIs. The candidate POI screening unit 434 may screen the candidate POIs based on the similarity degree of any two candidate POIs in the set of candidate POIs. The recommended POI determination unit may be configured to determine at least one recommended POI in response to the service request of the user. For example, the recommended POI determination unit may determine at least one candidate POI as the recommended POI based on the likelihood scoring value (scoring value) of each of one or more candidate POIs in the screened set of candidate POIs. In some embodiments, the recommended POI determination unit may obtain a sorting result by sorting the one or more candidate POIs in the screened set of candidate POIs based on the scoring value of each of the one or more candidate POIs, and determine at least one candidate POI as the recommended POI based on the sorting result. More descriptions regarding the determining the recommended POI from the set of candidate POIs may be found elsewhere in the present disclosure, for example, FIG. 7 and relevant descriptions thereof, which may not be repeated herein.

The candidate PUP determination module 440 may be configured to determine a candidate PUP. For example, the candidate PUP determination module 440 may determine at least one relevant PUP from the searched POI as the candidate PUP based on the location information of the searched POI, and add the candidate PUP to a first set of candidate PUPs. As another example, the candidate PUP determination module 440 may determine at least one security candidate PUP based on a parking risk value of each of the plurality of candidate PUPs in the first set of candidate PUPs, and adding the at least one security candidate PUP to a set of security PUPs. In some embodiments, the candidate PUP determination module 440 may further include a relevant PUP determination unit 442 and a security PUP determination unit 444.

The relevant PUP determination unit 442 may be configured to determine at least one PUP associated with the searched POI. For example, the relevant PUP determination unit 442 may determine at least one relevant PUP (e.g., a common PUP) within a preset range from the searched POI based on the information of the searched POI determined by the user, and add the at least one relevant PUP to the first set of candidate PUPs. As another example, the relevant PUP determination unit 442 may determine at least one historical PUP as the candidate PUP based on the historical behavior information of the user, and add the candidate PUP to the first set of candidate PUPs.

The security PUP determination unit 444 may be configured to determine at least one security candidate PUP. For example, the security PUP determination unit 444 may determine whether a parking risk of each candidate PUPs in the first set of candidate PUPs at a current time is less than a preset risk threshold based on information of one or more parking violation road sections. In response to that the parking risk of the candidate PUPs in the first set of candidate PUPs at the current time is less than the preset risk threshold, the candidate PUP may be added to the set of security PUPs. In some embodiments, the information of the one or more parking violation road sections may include information of a parking violation road section including a no-parking sign, information of a road section in a parking ticket, information of a parking violation road section acquired by a parking violation electronic eye, information of a parking violation road section reported by the user, or the like, or any combination thereof. In some embodiments, when the at least one location information (e.g., the positioning location of the user) of the current order is located in the parking violation road section, the security PUP determination unit 444 may determine whether the parking risks of the plurality of candidate PUPs (e.g., the candidate PUPs in the first set of candidate PUPs) related to the current order at the current time is less than the preset risk threshold. The one or more candidate PUPs each of whose parking risk is less than the preset risk threshold may be added to the set of security PUPs. In some embodiments, when the at least one location information (e.g., the positioning location of the user) of the current order is not located in the parking violation road section, the security PUP determination unit 444 may add the plurality of candidate PUPs (e.g., the candidate PUPs in the first set of candidate PUPs) related to the current order to the set of security PUPs. In some embodiments, the parking risk may be a ratio of a count (number) of tickets related to the candidate PUP to a total count (number) of orders related to the candidate PUP within a first preset time threshold. For example, the total count (number) of orders where the candidate PUP is a starting point and the count (number) of tickets received in the orders may be obtained within the first preset time threshold, and the parking risk of the candidate PUP may be obtained based on a ratio of the count (number) of tickets and the total count (number) of orders where the candidate PUP is the starting point. If the ratio of the count (number) of tickets received at the candidate PUP and the total count (number) of orders related to the candidate PUP is larger, a probability that a ticket of parking violation is received at the candidate PUP may be larger, and the parking risk of the candidate PUP may be larger. If the probability that the ticket of parking violation is received at the candidate PUP is less, the candidate PUP may be safer.

The recommended PUP determination unit 450 may be configured to determine at least one recommended PUP from the plurality of candidate PUPs. For example, the recommended PUP determination unit 450 may obtain second feature information of at least one candidate PUP in the first set of candidate PUPs or the set of security PUPs, and determine the at least one recommended PUP based on the second feature information of the at least one candidate PUP. In some embodiments, the second feature information of the candidate PUP may include a relationship feature between the candidate PUP and the searched POI, a relationship feature between the candidate PUP and the positioning location of the user, a self-attribute feature of the searched POI, a self-attribute feature of the candidate PUP, or the like, or any combination thereof. For example, the self-attribute feature of the candidate POI may include a type of the candidate POI, a count of candidate PUPs recalled by the candidate POI, a count of times that the POI is determined as a PUP, a count of times that the POI is not determined as a PUP, a hotness of the candidate POI, or the like, or any combination thereof. The relationship feature between the candidate POI and the positioning location of the user may include a distance feature, a feature whether to cross a road, or the like, or any combination thereof.

In some embodiments, the recommended PUP determination unit 450 may determine the recommended PUP based on a visibility of the candidate PUP. In some embodiments, the visibility of the candidate PUP may include a search hotness, a recognition, or the like, or any combination thereof. For example, the search hotness may include a count (number) of times (or frequency, probability, etc.) that the candidate PUP is searched and/or selected by the user. The recognition may include whether the candidate PUP is a business district, whether the candidate PUP includes a recognizable sign (e.g., a building, a sculpture, a plaque, etc.). The recommended PUP determination unit 450 may obtain information of the visibility of the candidate PUP from the storage device 130. In some embodiments, the visibility of the candidate PUP may be indicated as a scoring value. The higher the scoring value is, the higher the visibility may be. The lower the scoring value is, the lower the visibility may be. The scoring value may be obtained according to a historical search situation, a user evaluation situation, a staff rating, etc. In some embodiments, the recommended PUP determination unit 450 may determine whether the candidate PUP is easy to perceive based on the visibility of each candidate PUP, and further determine the at least one recommended PUP.

In some embodiments, the recommended PUP determination unit 450 may display the determined recommended PUP to the user. For example, the recommended PUP determination unit 450 may display a name, a position, a page layout, a special display marker, or the like, or any combination thereof, of the recommended PUP on a display interface of the user terminal 120.

In some embodiments, the recommended PUP determination unit 450 may further include a scoring value of candidate PUP determination unit and a recommended PUP determination unit (or a recommendation unit).

The scoring value of candidate PUP determination unit may be configured to determine the likelihood scoring value (or a similarity scoring value) of each candidate PUP in the plurality of candidate PUPs. For example, the scoring value of candidate PUP determination unit may determine the likelihood scoring value of at least one candidate PUP or a sorting result of the candidate PUPs by inputting the second feature information of the at least one candidate PUP in the first set of candidate PUPs or the set of security PUPs and the first feature information of the searched POI to a PUP recommendation model.

The recommended PUP determination unit may be configured to determine at least one candidate PUP as the recommended PUP. For example, the recommended PUP determination unit may determine the at least one candidate PUP as the recommended PUP based on the likelihood scoring value (or a similarity scoring value) of the at least one candidate PUP and/or based on the sorting result of the candidate PUPs. In some embodiments, the recommended PUP determination unit may recommend the determined at least one recommended PUP to the user, for example, displaying the at least one recommended PUP on the display interface of the user terminal. More descriptions regarding the determining the recommended PUP from the plurality of candidate PUPs may be found elsewhere in the present disclosure, for example, FIGS. 5, 8, and 11, and relevant descriptions thereof, which may not be repeated herein.

The training module 460 may be configured to determine a trained PUP recommendation model. For example, the training module 460 may obtain data of historical orders within a certain time period, determine a relevant scoring value of each PUP in each historical order based on feature information of the PUPs in the historical orders, and obtain the trained PUP recommendation model based on the feature information and the relevant scoring value. In some embodiments, the relevant scoring value may be obtained by manually scoring a relevance of each PUP based on experience. For example, a candidate PUP A may be manually scored as 5 points, and a candidate PUP B may be manually scored as 3 points. After the plurality of candidate PUPs are manually scored, the relevant scoring value of each candidate PUP may be stored as an output for the model training. In some embodiments, the feature information of the candidate PUP in the historical order and the corresponding relevant scoring value may be used as a training sample. The trained PUP recommendation model may be obtained by training a model using the feature information as an input and the relevant scoring value as an output. In some embodiments, the PUP recommendation model may include a classification and regression tree (CART), an iterative dichotomiser 3 (ID3) algorithm, a C4.5 algorithm, a random forest algorithm, a deep learning model, a support vector machine (SVM), or the like, or any combination thereof. In some embodiments, the PUP recommendation model may include a Lambdamart model. For example, the trained PUP recommendation model may be obtained by training the Lambdamart model using the feature information of the PUP in the historical order as the input and the relevant scoring value as the output.

In some embodiments, the training module 460 may screen the data of the plurality of historical orders based on a spatial position relationship between the billing point and the real PUP of each historical order, and obtain the trained PUP recommendation model based on the screened data. In some embodiments, the training module 460 may further include a sample data obtaining unit 462, a training sample determination unit (or a data screening unit) 464, and a model determination unit 466.

The sample data obtaining unit 462 may be configured to obtain the data of the historical orders. For example, the sample data obtaining unit 462 may obtain data of a plurality of historical orders from the user terminal 120, or the storage device 130. In some embodiments, the sample data obtaining unit 462 may be configured to obtain a billing point and a real point of each historical order.

In some embodiments, the sample data obtaining unit 462 may be configured to obtain a motion trajectory of a driver terminal (a service provider terminal) and a motion trajectory of a passenger terminal (a service requester terminal) in each historical order. For example, the sample data obtaining unit 462 may obtain the motion trajectory of the driver terminal from a location where a driver of the driver terminal receives the historical order to a location where the driver picks up a passenger. As another example, the sample data obtaining unit 462 may obtain the motion trajectory of the passenger terminal from a location where the passenger terminal initiates the historical order to the location where the driver picks up the passenger. In some embodiments, the sample data obtaining unit 462 may be configured to determine, based on the motion trajectory of the driver terminal, at least one stopping point of the driver terminal. The at least one stopping point may be one of trajectory points of the driver terminal.

In some embodiments, the sample data obtaining unit 462 may determine whether a dwell time of the driver terminal at a motion trajectory point is larger than a second preset time threshold; in response to that the dwell time of the driver terminal at the motion trajectory point is larger than the second preset time threshold, determine whether motion trajectory points within the second preset time threshold is available to be clustered; and in response to that the motion trajectory points within the second preset time threshold is available to be clustered, determine the at least one stopping point of the driver terminal based on the clustered motion trajectory points of the driver terminal.

In some embodiments, the sample data obtaining unit 462 may be configured to determine, based on the motion trajectory of the passenger terminal, at least one stopping point of the passenger terminal. The at least one stopping point may be one of trajectory points of the passenger terminal. In some embodiments, the sample data obtaining unit 462 may determine whether a dwell time of the passenger terminal at a motion trajectory point is larger than a third preset time threshold; in response to that the dwell time of the passenger terminal at the motion trajectory point is larger than the third preset time threshold, determine whether motion trajectory points within the third preset time threshold is available to be clustered; and in response to that the motion trajectory points within the third preset time threshold is available to be clustered, determine the at least one stopping point of the passenger terminal based on the clustered motion trajectory points of the passenger terminal.

In some embodiments, the sample data obtaining unit 462 may be configured to determine the real PUP based on the at least one stopping point of the driver terminal and the at least one stopping point of the passenger terminal. In some embodiments, the sample data obtaining unit 462 may obtain a time period when the movement trajectory of the driver terminal and the movement trajectory of the passenger terminal generate an intersection, determine a first distance between one intersection point (i.e., a first stopping point) among the plurality of intersection points (i.e., a set of first stopping points) and the at least one stopping point of the driver terminal, and determine a second distance between the intersection point and the at least one stopping point of the passenger terminal, and determine an intersection point of the plurality of intersection points to be the real PUP, wherein the first distance and the second distance corresponding to the intersection point are minimum.

In some embodiments, the sample data obtaining unit 462 may further at least include a motion trajectory obtaining unit, a stopping point of driver terminal determination unit, a stopping point of passenger terminal determination unit, and a real PUP determination unit. The motion trajectory obtaining unit may be configured to obtain the motion trajectory of the service provider terminal and the motion trajectory of the service requester terminal in each historical order. The stopping point of driver terminal determination unit may be configured to determine, based on the motion trajectory of the service provider terminal, the at least one stopping point of the service provider terminal. The stopping point of passenger terminal determination unit may be configured to determine, based on the motion trajectory of the service requester terminal, the at least one stopping point of the service requester terminal. The real PUP determination unit may be configured to determine the real PUP based on the at least one stopping point of the service provider terminal and the at least one stopping point of the service requester terminal.

The training sample determination unit 464 may be configured to determine training samples. For example, the training sample determination unit 464 may screen the data of the plurality of historical orders based on the spatial position relationship between the billing point and the real PUP of each historical order, and designate the screened data as the training samples.

In some embodiments, the training sample determination unit 464 may determine a distance between the billing point and the real PUP of each historical order, and screen the data of the obtained plurality of historical orders based on the distance between the billing point and the real PUP of each historical order. The screening the data of the obtained plurality of historical orders based on the distance between the billing point and the real PUP of each historical order may include that the historical order does not pass the screening in response to the distance between the billing point and the real PUP in the historical order is larger than a second preset distance threshold.

In some embodiments, the training sample determination unit 464 may be configured to screen the data of the obtained plurality of historical orders based on whether the billing point and the real PUP in the historical order are located in a same road section. In some embodiments, the training sample determination unit 464 may screen the data of the obtained plurality of historical orders based on whether the billing point and the real PUP in the historical order are located in the same road section in response to the distance between the billing point and the real PUP in the historical order is less than or equal to the second preset distance threshold, determine that the historical order passes the screening in response to that the billing point and the real PUP in the historical order are located in the same road section, and determine the historical order passes the screening as the training sample.

In some embodiments, the training module 460 may further at least include a distance relationship screening module and a cross-road relationship screening module. The distance relationship screening module may be configured to determine the distance between the billing point and the real PUP in each historical order, and then screen the data of the plurality of historical orders based on the distance between the billing point and the real PUP of each historical order. The cross-road relationship screening module may be configured to screen the data of the obtained plurality of historical orders based on whether the billing point and the real PUP in the historical order are located in the same road section in response to the distance between the billing point and the real PUP in the historical order is less than or equal to the second preset distance threshold.

The model determination unit 466 may be configured to determine the PUP recommendation model. For example, the model determination unit 466 may obtain the trained PUP recommendation model by training an initial machine learning model using the historical order that passes the filtering as the training sample. In some embodiments, the model determination unit 466 may obtain a searched POI and a PUP in each historical order, determine a feature of the searched POI and a feature of the PUP in each historical order, determine a label of the historical order based on a spatial position relationship between a recommended PUP and the real PUP of each historical order, and obtain the trained PUP recommendation model by training, based on the feature of the searched POI of the screened data and the feature of the PUP in the historical order and the label of the historical order, the initial machine learning model.

In some embodiments, the PUP recommendation system 400 may also include a communication module. The communication module may be configured to receive a request or intention of a transportation service from a mobile device (e.g., the user terminal 120). In some embodiments, the user terminal 120 (e.g., a smartphone of the user) may be installed with an application for requesting the transport service. Through an interface of the application, the user terminal 120 may be connected to and communicated with the PUP recommendation system 100. For example, the service requester may input the search POI related to the transportation service through the user terminal 120, and send a request including the search POI of the transportation service to the communication module via the network 150. In some embodiments, the application may indicate that the user terminal 120 continuously monitors the input from the user (e.g., the service requester and/or the service provider), and transmits the input to the communication module.

In some embodiments, the communication module may send one or more recommended PUP to the service requester and/or the service provider. In some embodiments, if the recommended PUP determination module 450 determines at least one recommended PUP, the communication module may send the recommended PUP to the service requester. The service requester may select one from the at least one recommended PUP. After receiving the at least one recommended PUP, the application installed in the server requester terminal (e.g., the user terminal 120) may provide an interface for informing the passenger in a form of text, sound, a picture, a video, or the like, or any combination thereof. For example, the interface of the application may display a list of the at least one recommended PUP. In the list, the at least one recommended PUP be sorted in ascending, descending, or random order. The passenger may choose a PUP from the list. After receiving an instruction that selects one from the at least one recommended PUP, the server requester terminal may send the selected PUP to the processing device 112. Alternatively or additionally, after receiving the selected PUP from the server requester terminal, the communication module may send the selected PUP to the service provider that provides the transportation service to the service requester. In some embodiments, the communication module may be configured to transfer information and/or instructions to one or more components of the system 100. For example, the communication module may send the information and/or instructions to the service request terminal and/or the service provider terminal. As another example, the communication module may send information (e.g., the positioning location of the user) related to the service request to the server 110.

It should be noted that the PUP recommendation system 400 and its modules illustrated in FIG. 4 may be implemented via various ways. For example, in some embodiments, the PUP recommendation system 400 and its modules may be implemented through hardware, software, or a combination thereof. Herein, the hardware may be implemented by a dedicated logic; the software may be stored in the storage, the PUP recommendation system 400 may be executed by proper instructions, for example, by a microprocessor or a dedicated design hardware. Those skilled in the art can understand that, the methods and systems described in the present disclosure may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The PUP recommendation system 400 and its modules in the present disclosure may be implemented by a hardware circuit in a programmable hardware device in an ultra large scale integrated circuit, a gate array chip, a semiconductor such as a transistor, a field programmable gate array, a programmable logic device, a software performed by various processors, or a combination thereof (e.g., firmware).

It should be noted that the above descriptions of the PUP recommendation system 400 and its modules are merely provided for illustration, and not intended to limit the scope of the present disclosure. Apparently, for those skilled in the art, after understanding the principle of the PUP recommendation system 400, it is possible to arbitrarily combine various modules, or form a subsystem to connect with other modules without departing from this principle. For example, the sample data obtaining unit 462 in the training module 460 may be integrated as a single module in the obtaining module 410. The single module may obtain data of a plurality of historical orders, and obtain a billing point and a real PUP of each historical order. As another example, the sample data obtaining unit 462 may further include a motion trajectory obtaining unit, a stopping point of driver terminal determination unit, a stopping point of passenger terminal determination unit, and a real PUP determination unit which perform functions of the sample data obtaining unit 462, respectively. Alternatively, each module may share a same storage module, or each module may also include its own storage module. Such deformations do not depart from the scope of the present disclosure.

Figure 5:
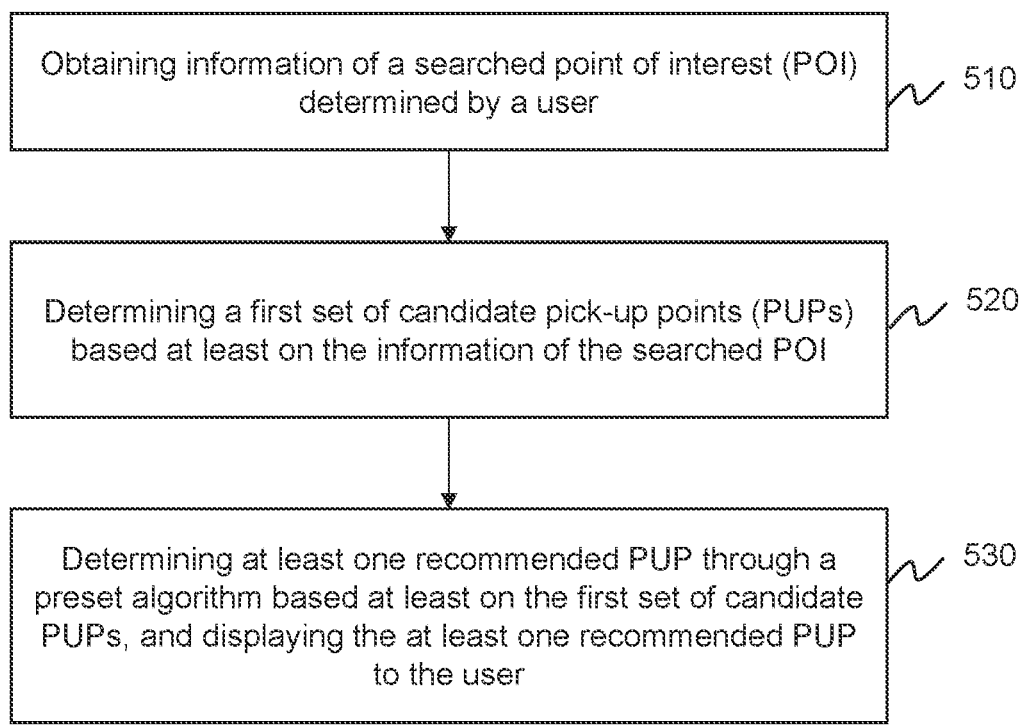
FIG. 5 is a flowchart illustrating an exemplary process for recommending a pick-up point according to some embodiments of the present disclosure.

FIG. 5 is a flowchart illustrating an exemplary process for recommending a pick-up point (PUP) according to some embodiments of the present disclosure.

In some embodiments, at least a portion of process 500 may be implemented on the computing device 200 as shown in FIG. 2 or on the mobile device 300 shown in FIG. 3. In some embodiments, one or more operations in the process 500 may be performed by the PUP recommendation system 100 as shown in FIG. 1. For example, one or more operations in the process 500 may be stored in a storage device (e.g., the storage device 130 or a storage unit of the processing device) in a form of programs or instructions. When the processor 210, the CPU 340, or the modules shown in FIG. 4 executes the programs or the instructions, the process 500 may be implemented. In some embodiments, the instruction may be transmitted in a form of an electron current or electrical signal. In some embodiments, the process 500 may be accomplished with one or more additional operations not described and/or without one or more of the operations discussed. Additionally, the order in which the operations of the process 500 illustrated in FIG. 5 and described below is not intended to be limited.

In 510, information of a searched point of interest (POI) determined by a user may be obtained. In some embodiments, operation 510 may be performed by the obtaining module 410.

In some embodiments, the searched POI may include an initial or desired pick-up point (PUP) when the user initiates a service request through an online to offline service platform (e.g., an application) implemented on a user terminal. For example, the searched POI may include a PUP manually added by the user through the online to offline service platform (e.g., an application), a location that the user determines on a map with a big head pin, a current location of the user, a historical PUP determined based on a historical order of the user, etc. In some embodiments, a manner that the user manually adds the PUP may include a typing input, a handwriting input, a selection input, a voice input, a scanning input, or the like, or any combination thereof. For instance, the typing input may include an English input, a Chinese input, etc., based on a language. The selection input may include selecting a POI from a selection list. The scanning input may include a barcode scanning input, a text scanning input, an image scanning input, a quick response (QR) code scanning input, etc.

In some embodiments, the searched POI determined by the user may include keywords related to hotels, shopping malls, hospitals, communities, stations, schools, crossroads, etc. For example, the searched POI may include a west gate of Tsinghua University, an outpatient building of Peking Union Medical College Hospital, etc.

In some embodiments, the searched POI may include at least one location information of a current order (the service request). In some embodiments, the searched POI may include a plurality of location information of the current order (the service request). For example, the searched POI may include a plurality of preset PUPs input by a plurality of users.

In some embodiments, the user may input the determined searched POI through a user terminal. For example, the user may select one recommended POI from recommended points of interest (POIs) displayed by the user terminal 120 as the searched POI. As another example, the user may manually input a PUP (i.e., the searched POI) by handwriting, pronunciation, speech, scanning, etc., and send an order request. In some embodiments, the user terminal may include a client that sends the service request and/or a driver terminal that receives an order to provide a service.

In some embodiments, the information of the searched POI may include location information of the searched POI. For example, the location information may include latitude and longitude coordinates, a geographic location name, geocoding of the location, etc. In some embodiments, the location information of the searched POI may include an altitude, roads in a road network where the searched POI is located, a region of the road network where the searched POI is located, or the like, or any combination thereof. In some embodiments, the location information of the searched POI may be obtained using a plurality of manners. For example, the location information of the searched POI may be queried or retrieved from a map database (e.g., the storage device 130). As another example, the location information of the searched POI may be queried from vehicle GPS trajectory data (or GPS log) in a car-hailing platform. In some embodiments, the user terminal may send the location information of the searched POI to the server. In some embodiments, the user terminal may obtain the location information of the searched POI from the server.

In 520, a first set of candidate PUPs may be determined based at least on the information of the searched POI. In some embodiments, operation 520 may be performed by the candidate PUP determination module 440.

In some embodiments, the first set of candidate PUPs may include one or more candidate PUPs related to the searched POI. In some embodiments, the candidate PUP may indicate a preset PUP that can be provided to the user. For example, the candidate PUP may include a hospital gate, a school gate, a park gate, a bus station, a community gate, a scenic entrance and exit, an intersection, or the like, or any combination thereof. In some embodiments, the first set of candidate PUPs may include a PUP related to the searched POI and/or a historical PUP related to the searched POI.

In some embodiments, the processing device may determine at least one relevant PUP within a preset range from the searched POI as the candidate PUP based on the location information of the searched POI, and add the candidate PUP to the first set of candidate PUPs. In some embodiments, the relevant PUP determination unit 442 may obtain a set of relevant PUPs within the preset range from the searched POI based on the location information of the searched POI determined by the user. For example, using a location of the searched POI (e.g., latitude and longitude coordinates of the searched POI) as a center point, at least one PUP within a range of a certain radius (e.g., 50 meters, 100 meters, 200 meters, 500 meters, etc.) from the center point may be determined as the relevant PUP. In some embodiments, the set of relevant PUPs may include a set of location points where passengers are likely to pick up or drivers are waiting for the passengers to pick up and/or PUPs commonly used by most users of a transportation service platform (e.g., an online car-hailing platform). For example, the set of relevant PUPs may include a north gate of Peking Union Medical College Hospital, a west gate of Beijing University of Posts and Telecommunications, Heping Xiqiao Bus Station, Exit A of Wudaokou Subway Station, etc.

In some embodiments, the processing device may determine a PUP in the historical order related to the location of the searched POI as the candidate PUP based on the location information of the searched POI. For example, the relevant PUP determination unit 442 may obtain at least one historical PUP of the historical order based on the historical order of the user, determine the at least one historical PUP as the candidate PUP, and add the candidate PUP to the first set of candidate PUPs. In some embodiments, the relevant PUP determination unit 442 may obtain historical PUPs within a preset time period (e.g., 1 month, 3 months, half a year, one year) as the candidate PUPs. For example, in a service request, the searched POI may be a preset PUP, but in a historical order, an actual PUP of the user may include other nearby PUPs, and the relevant PUP determination unit 442 may determine the historical PUPs related to the location (the searched POI) as the candidate PUPs.

In some embodiments, the candidate PUP may be determined based on personal habits of the user. For example, PUPs near the location of the searched POI that are commonly used by the user may be determined as the candidate PUPs. In some embodiments, the processing device may determine the searched POI as the candidate PUP.

In some embodiments, when the obtained searched POI includes a plurality of PUPs input by a plurality of users, the processing device may obtain, based on a PUP input by each user, a plurality of candidate PUPs related to the PUP.

In some embodiments, the user terminal may determine the first set of candidate PUPs based on the information of the searched POI determined by the user. In some embodiments, the user terminal may send the searched POI and/or the information thereof to the server, and obtain the first set of candidate PUPs determined by the server.

In 530, at least one recommended PUP may be determined through a preset algorithm based at least on the first set of candidate PUPs, and the at least one recommended PUP may be displayed to the user. In some embodiments, operation 530 may be performed by the recommended PUP determination module 450.

In some embodiments, the processing device may determine the at least one recommended PUP based on feature information (e.g., second feature information) of each candidate PUP in the first set of candidate PUPs. In some embodiments, the preset algorithm may include a trained PUP recommendation model. For instance, the PUP recommendation model may include a Lambdamart model. For example, the trained recommended PUP determination module 450 may input features (e.g., the second feature information) related to at least one candidate PUP in the first set of candidate PUPs into the trained PUP recommendation model, determine a likelihood scoring value of each candidate PUP in the first set of candidate PUPs, and determine the at least one recommended PUP based on the likelihood scoring value. More descriptions regarding the PUP recommendation model may be found elsewhere in the present disclosure, for example, FIGS. 9-10 and relevant descriptions thereof, which may not be repeated herein.

In some embodiments, the processing device may determine a set of security PUPs based on the first set of candidate PUPs, and determine the at least one recommended PUP through the preset algorithm based on the set of security PUPs. For example, the security PUP determination unit 444 may obtain information of one or more parking violation road sections, and determine whether each of the plurality of candidate PUPs in the first set of candidate PUPs meets a preset security condition based on the information of the one or more parking violation road sections. A candidate PUP that satisfies the preset security condition may be referred to as a security PUP. In response to that the candidate PUP meets the preset security condition, the candidate PUP may be added to the set of security PUPs. The recommended PUP determination module 450 may determine the at least one recommended PUP based on the second feature information of the candidate PUP in the set of security PUPs. More descriptions regarding the security PUP may be found elsewhere in the present disclosure, for example, FIG. 8 and relevant descriptions thereof, which may not be repeated herein.

In some embodiments, the recommended PUP determination module 450 may determine the at least one recommended PUP based on a visibility of each candidate PUP. In some embodiments, the recommended PUP determination module 450 may determine whether the candidate PUP is easy to perceive based on the visibility of each candidate PUP, and further determine the at least one recommended PUP.

In some embodiments, the recommended PUP determination module 450 may determine the at least one recommended PUP from the first set of candidate PUPs based on location information of the user. For example, the recommended PUP determination module 450 may determine a walking cost that the user goes to each candidate PUP based on the location information of the user and the location information of each candidate PUP, sort the candidate PUP based on the walking cost, and select at least one (e.g., 1, 2, 3, 4, 5, etc.) candidate PUP with a lowest walking cost as the recommended PUP. As another example, the recommended PUP determination module 450 may also determine, based on a straight-line distance between the user and each candidate PUP, at least one candidate PUP with a closest straight-line distance as the recommended PUP. Still another example, the recommended PUP determination module 450 may further determine the recommended PUP according to and/or combined with information such as a walking time, a count (number) of traffic lights, etc., that the user goes to each candidate PUP.

In some embodiments, the recommended PUP determination module 450 may determine the at least one recommended PUP from the first set of candidate PUPs based on historical vehicle usage information of the user. For example, the recommended PUP determination module 450 may determine at least one (e.g., 1, 2, 3, etc.) candidate PUP with a highest count (number) of user's historical choices as the recommended PUP based on the historical vehicle usage information of the user. The historical vehicle usage information of the user may refer to information related to a historical order. In some embodiments, the historical vehicle usage information of the user may include historical vehicle usage information of the user himself. In some embodiments, the historical vehicle usage information of the user may also include historical vehicle usage information of other users associated with the user. For example, the other users associated with the user may include other users whose home address, company address, etc., are the same as or similar to the home address, the company address, etc., of the user.

In some embodiments, when the obtained searched POI includes the plurality of PUPs input by the plurality of users, the processing device may determine one or more corresponding recommended PUPs based on the candidate PUP related to each determined PUP. For example, the processing device 112 may obtain, based on a PUP input by each user, a plurality of candidate PUPs related to the PUP, determine a corresponding set of security PUPs, and further determine the corresponding recommended PUP.

In some embodiments, the processing device may obtain information of a plurality of searched POIs, and determine a plurality of corresponding recommended PUPs based on the information of the plurality of searched POIs. For example, the processing device 112 may obtain a plurality of location information of a current order, and determine a plurality of corresponding recommended PUPs based on the plurality of location information.

In some embodiments, the user terminal may determine the at least one recommended PUP based on the first set of candidate PUPs obtained from the server or the first set of candidate PUPs determined by the user terminal. In some embodiments, the user terminal may send the determined first set of candidate PUPs to the server, and obtain the at least one recommended PUP determined based on the first set of candidate PUPs. In some embodiments, the user terminal may display the determined recommended PUP to the user. For example, the user terminal 120 may display the determined recommended PUP on a terminal display interface, so that the user rides based on the recommended PUP, or the driver picks up a passenger based on the recommended PUP.

In some embodiments, the user terminal or the server may obtain the information of the one or more parking violation road sections. When at least one location information (e.g., a positioning location of the user terminal or the searched POI) of the current order of the user is located at a parking violation road section, the user may be prompted, through the user terminal, that at least one location of the current order is at risk of parking violation. For example, the user terminal may send a message, a speech broadcast, or a pop-up alert in a transportation service application (APP) (e.g., an online car-hailing APP) to remind the driver terminal that at least one location of the current order is at risk of parking violation.

It should be noted that the description of the process 500 is merely for example and illustration, and not intended to limit the scope of the present disclosure. For those skilled in the art, various variations or modifications of the process 500 may be made under the teachings of the present disclosure. However, those variations and modifications do not depart from the scope of the present disclosure.

Figure 6:
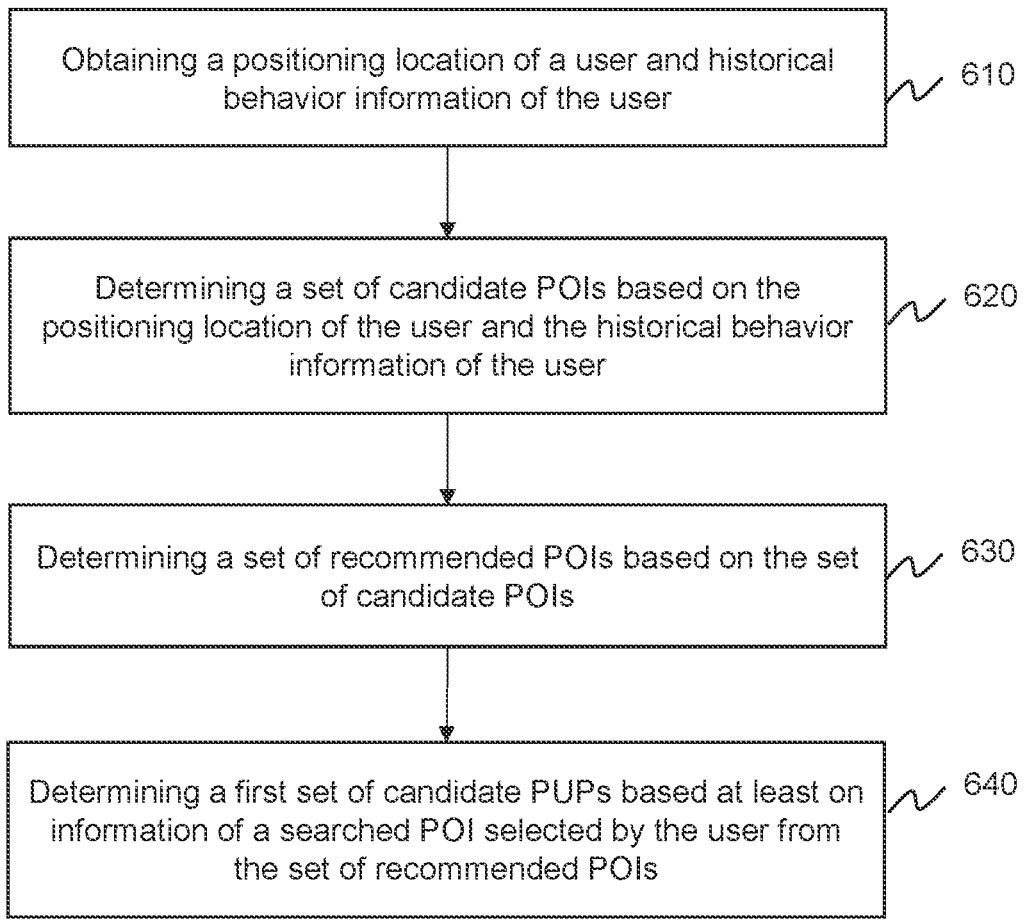
FIG. 6 is a flowchart illustrating an exemplary process for determining a recommended pick-up point according to some embodiments of the present disclosure.

FIG. 6 is a flowchart illustrating an exemplary process for determining a recommended pick-up point (PUP) according to some embodiments of the present disclosure.

As shown in FIG. 6, in some embodiments, the processing device (e.g., the processing device 112 shown in FIG. 1) may determine a set of recommended points of interest (POIs) based on a positioning location of a user, and determine a first set of candidate PUPs based at least on information of a searched point of interest (POI) selected by the user from the set of recommended POIs. In some embodiments, at least a portion of process 600 may be implemented on the computing device 200 as shown in FIG. 2 or on the mobile device 300 shown in FIG. 3. In some embodiments, one or more operations in the process 600 may be performed by the PUP recommendation system 100 as shown in FIG. 1. For example, one or more operations in the process 600 may be stored in the storage device 130 and/or a storage in a form of instructions, and retrieved and/or performed by a processing device (e.g., the processing device 112, the processor 210, or the CPU 340). In some embodiments, the instruction may be transmitted in a form of an electron current or electrical signal.

In 610, a positioning location of a user and historical behavior information of the user may be obtained. In some embodiments, operation 610 may be performed by the obtaining module 410.

In some embodiments, the positioning location of the user may include a positioning location of a user terminal when the user initiates a service request. In some embodiments, the processing device may obtain the positioning location of the user terminal by a positioning system mounted on a user mobile device. For example, the processing device 112 may obtain a positioning location of the user terminal 120 by communicating with the positioning system through a car-hailing APP mounted on the user terminal 120. In some embodiments, the user terminal 120 may send the positioning location of the user to the server 110 via the network 150.

In some embodiments, the obtaining module 410 may access and/or read data stored in the server 110, the user terminal 120, and/or the storage device 130 via the network 150, and obtain the historical behavior information of the user based on information (e.g., user name, identification (ID), etc.) of the user (e.g., a target user). In some embodiments, the historical behavior information may include a historically searched POI, a click rate of the historically searched POI, a historical PUP, or the like, or any combination thereof. In some embodiments, the historically searched POI may indicate a POI historically searched or clicked by the user. In some embodiments, the historically searched POI may include various types of words, letters, numbers, characters, or the like, or any combination thereof, historically input or clicked by the user through the user terminal 120. For example, the searched POI historically searched or clicked by the user may include keywords related to hotels, shopping malls, hospitals, communities, stations, schools, intersections, etc. As another example, the searched POI may include a west gate of Tsinghua University, an outpatient building of Peking Union Medical College Hospital, etc. In some embodiments, the click rate of the historically searched POI may indicate a ratio of a count (number) of times that the user searches for/clicks on a target POI in a preset time period to a total count (number) of times that all POIs are searched for/clicked on in the preset time period. The click rate of the historically searched POI may really reflect a probability of the target POI to be clicked or searched by the user. If the click rate of the target POI is higher, the probability that the target POI is clicked or searched may be higher. In some embodiments, the historical PUP may indicate a PUP in a historical car-hailing service of the user. Further, the historical PUP may include a PUP that is selected from the historical candidate PUPs as a corresponding PUP in a historical order.

In 620, a set of candidate POIs may be determined based on the positioning location of the user and the historical behavior information of the user. In some embodiments, operation 620 may be performed by the candidate POI determination module 420.

The set of candidate POIs may include a plurality of candidate POIs. In some embodiments, the processing device may determine a set of first POIs based at least on the positioning location of the user. For example, the set of first POIs determination unit 422 may obtain at least one POI within a preset range from the positioning location as the first POI based on the positioning location of the user. In some embodiments, the first POI may include a high-hotness POI. For example, the set of first POIs determination unit 422 may obtain at least one high-hotness POI in a region within a certain range from the positioning location of the user as the candidate POI based on the positioning location of the user. For instance, the set of first POIs determination unit 422 (high-hotness POI determination unit) may obtain a set of POIs within the preset range from the user based on the positioning location of the user, determine one or more POIs each of whose hotness value is greater than a preset threshold as the high-hotness POI based on a hotness of each POI in the set of POIs, and add the high-hotness POI into the set of first POI. As used herein, the hotness of the POI may indicate a count (number) of times that the POI is searched or clicked. If the count (number) of the POI is searched or clicked more times (e.g., than a threshold, 20, 50, 100, 200, 300, 400), the hotness may be higher, and the POI is also referred to as a high-hotness POI. The region within the certain range from the user may include a geographic region having a setting coverage area including the location of the user terminal. For example, using the location of the user as a center point, a set of POIs within a preset range of a certain radius (e.g., 600 meters, 800 meters) from the center point may be obtained, and POIs with a hotness greater than a preset threshold (e.g., 0.7) may be screened from the set of POIs as the high-hotness POIs. In some embodiments, the preset range may be a value preset by the PUP recommendation system 100, such as 100 meters, 200 meters, 500 meters, 800 meters, etc. In some embodiments, the preset range may be related to the positioning position of the user where an order request (the service request) is initiated. For example, a preset range that the positioning location of the user is located at a bustling region may be less than a preset range that the positioning location of the user is located at a remote region.

In some embodiments, the set of first POIs determination unit 422 may determine the set of first POIs including one or more first POIs within a preset range of the positioning location. A spatial distance between each of the one or more first POIs with the positioning location of the user may be less than a first preset distance threshold.

In some embodiments, the processing device may determine a set of second POIs based on the historical behavior information of the user. For example, the historically searched POI determination unit 424 (i.e., the set of second POIs determination unit) may determine one or more POIs that are historically clicked and/or searched by the user as the second POI based on the historical behavior information of the user, and add the one or more POIs to the set of second POIs. In some embodiments, the historically searched POI determination unit 424 (i.e., the set of second POIs determination unit) may obtain a set of POIs that are historically clicked and/or searched by the user as historically searched POIs (i.e., the set of second POIs). In some embodiments, the historically searched POI determination unit 424 (i.e., the set of second POIs determination unit) may obtain one or more historically searched POIs in a preset time period (e.g., 1 month, 3 months, half a year, one year). In some embodiments, the historically searched POI determination unit 424 (i.e., the set of second POIs determination unit) may also screen out one or more historically searched POIs each of whose searched hotness is larger than a preset threshold as the candidate POIs (or the second POIs). The searched hotness of the historically searched POI may indicate a count (number) of times that the searched POI is historically searched. If the count (number) of times that the searched POI is historically searched is higher, the searched hotness is higher, and the searched POI is more likely to be searched again by the user.

In some embodiments, the candidate POI determination module 420 may determine the set of candidate POIs based on the set of first POIs and the set of second POIs. For example, the candidate POI determination module 420 may determine a union or intersection of the set of first POIs and the set of second POIs as the set of candidate POIs. As another example, the candidate POI determination module 420 may obtain information of the historically searched POI of the user, determine at least one historically searched POI (i.e., the second POI) in the set of second POIs as the candidate POI based on the positioning location, a time, and/or a click rate of the historically searched POI of the user, and add the at least one historically searched POI to the set of candidate POIs. Still another example, the candidate POI determination module 420 may determine at least one first POI as the candidate POI based on a hotness of each POI in the set of first POIs and/or a spatial distance between each POI and the positioning location, and add the at least one first POI to the set of candidate POIs.

In some embodiments, the processing device may determine the set of candidate POIs based on a searched keyword input by the user. For example, the candidate POI determination module 420 may retrieve, based on a keyword matching technique, one or more POIs each of whose name is the same as or similar to the searched keyword as the candidate POI, and add the one or more POIs to the set of candidate POIs. In some embodiments, the candidate POI determination module 420 may select top n (e.g., 10, 15, 20, 30, etc.) POIs with a text similarity degree as the candidate POI. In some embodiments, the candidate POI determination module 420 may select one or more POIs each of whose text similarity degree is larger than a certain threshold (e.g., 60%, 80%, etc.) as the candidate POI. A determination of the text similarity degree may be performed using any of feasible similarity degree determination technique. For example, the determination of the text similarity degree may include determining a Jaccard similarity degree coefficient, a cosine similarity degree, a Manhattan distance, a Euclidean distance, a Ming style distance, an editing distance, or the like, or any combination thereof, of the searched keyword and the name of the POI. In some embodiments, determining at least one candidate POI based on the searched keyword may also be applied to a field, such as mapping, navigation, etc. The information of the POI may be stored in the storage device 130.

In some embodiments, the processing device may determine the set of candidate POIs based on the positioning position of the user, the searched keyword of the user, a historical behavior of the user, or the like, or any combination thereof.

In 630, a set of recommended POIs may be determined based on the set of candidate POIs. In some embodiments, operation 630 may be performed by the recommended POI determination module 430.

In some embodiments, the processing device may score and screen the candidate POIs in the set of candidate POIs, and determine the set of recommended POIs. The set of recommended POIs may include at least one recommended POI. In some embodiments, the processing device may determine the set of recommended POIs based on a POI recommendation model. For example, the recommended POI determination module 430 may determine a likelihood scoring value (i.e., scoring value) of each candidate POI in the set of candidate POIs by inputting features (e.g., first feature information) of the candidate POI among the set of candidate POIs to the POI recommendation model, determine similarity degrees between any two candidate POIs in the set of candidate POIs, screen (e.g., de-duplicate) the candidate POIs in the set of candidate POIs based on the similarity degrees between any two candidate POIs, and determine the at least one candidate POI as the recommended POI based on the likelihood scoring values of the screened candidate POIs. In some embodiments, the recommended POI determination module 430 may obtain a sorting result by sorting the screened candidate POIs based on the likelihood scoring values of the screened candidate POIs, and determine the at least one candidate POI as the recommended POI based on the sorting result.

In some embodiments, the POI recommendation model may be obtained by training an initial machine learning model through data related to a plurality of historical behaviors of the user. For example, the initial machine learning model may include a classification and logistic regression model, a K-nearest neighbor (KNN) model, a plain Bayes (NB) model, a support vector machine (SVM), a decision tree (DT), a random forest model, a regression tree model, a gradient boosting decision tree (GBDT) model, an eXtreme gradient boosting (xgboost) model, a light gradient boosting machine (LightGBM), a gradient boosting machine (GBM), a least absolute shrinkage and selection operator (LASSO), an artificial neural network (ANN), or the like, or any combination thereof. For instance, the initial machine learning model may include the xgboost model. Merely by way of example, relevant data of a historical behavior of a user may be designated as a training sample, and a POI actually selected to be searched in a historical service request of the user may be designated as a ground truth. A feature may be extracted from the relevant data of the historical behavior of the user. The xgboost model may be trained by designating the extracted feature and sample date including the ground truth as an input of the xgboost model. In some embodiments, the POI recommendation model may include a default setting (e.g., one or more initial parameters) or be adjusted in different situations.

Figure 7:
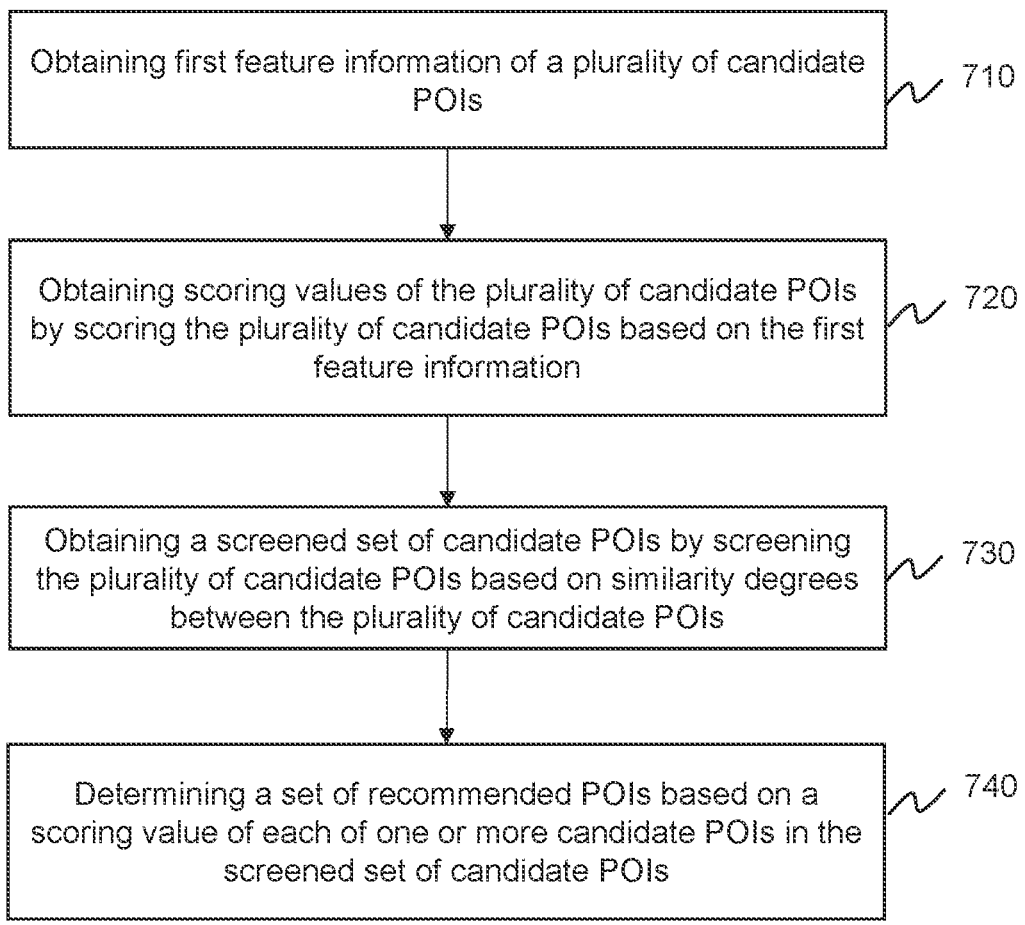
FIG. 7 is a flowchart illustrating an exemplary process for determining a recommended pick-up point according to some embodiments of the present disclosure.

More descriptions regarding the determination of the recommended POI from the plurality of candidate POIs may be found elsewhere in the present disclosure, for example, FIG. 7 and relevant descriptions thereof, which may not be repeated herein.

In some embodiments, after obtaining (e.g., obtain from the server 110) or determining the set of recommended POIs, the user terminal 120 may display the obtained or determined recommended POIs on a display interface of the user terminal 120. In some embodiments, the user terminal may add a prompt tag to the recommended POIs to guide the attention of the user when displaying on the display interface of the user terminal 120.

In 640, a first set of candidate PUPs may be determined based at least on information of the searched POI selected by the user from the set of recommended POIs. In some embodiments, operation 640 may be performed by the candidate PUP determination module 440.

In some embodiments, the user may select at least one POIs to search based on a list of recommended POIs (i.e., the set of recommended POIs) displayed on the display interface of the user terminal 120. In some embodiments, the processing device (e.g., the obtaining module 410, or the candidate PUP determination module 440) may obtain the information of the searched POI selected by the user. For example, the list of recommended POIs may include a plurality of POIs, such as East Gate 2 of Peking University, a subway station at an east gate of Peking University, geology building of Peking University, Chengfu Road, an intersection of Chengfu Road and Dachengfang, etc. The user may select any of the above POIs (e.g., East Gate 2 of Peking University) to search, and the obtaining module 410 may obtain information of the POI (e.g., East Gate 2 of Peking University) selected by the user.

In some embodiments, the processing device may obtain a PUP and/or a historical PUP related to the searched POI as the candidate PUP based at least on the information of the searched POI, and add the candidate PUP to the first set of candidate PUPs. More descriptions regarding the candidate PUP may be found elsewhere in the present disclosure, for example, FIG. 5 and relevant descriptions thereof, which may not be repeated herein.

It should be noted that the description of the process 600 is merely for example and illustration, and not intended to limit the scope of the present disclosure. For those skilled in the art, various variations or modifications of the process 600 may be made under the teachings of the present disclosure. However, those variations and modifications do not depart from the scope of the present disclosure.

FIG. 7 is a flowchart illustrating an exemplary process for determining a recommended pick-up point (PUP) according to some embodiments of the present disclosure.

In some embodiments, at least a portion of process 700 may be implemented on the computing device 200 as shown in FIG. 2 or on the mobile device 300 shown in FIG. 3. In some embodiments, one or more operations in the process 700 may be performed by the PUP recommendation system 100 as shown in FIG. 1. For example, one or more operations in the process 700 may be stored in the storage device 130 and/or a storage in a form of instructions, and retrieved and/or performed by a processing device (e.g., the processing device 112, the processor 210, or the CPU 340). In some embodiments, the instruction may be transmitted in a form of an electron current or electrical signal. In some embodiments, the process 700 may be accomplished with one or more additional operations not described and/or without one or more of the operations discussed. Additionally, the order in which the operations of the process 700 illustrated in FIG. 7 and described below is not intended to be limited.

In 710, first feature information of a plurality of candidate points of interest (POIs) may be obtained.

In some embodiments, the processing device may obtain one or more features (e.g., the first feature information) of each candidate point of interest (POI) in the set of candidate POIs. For example, the processing device 112 may obtain the first feature information of the candidate POI through a feature extraction model.

In some embodiments, the one or more features (e.g., the first feature information) of the candidate POI may include a self-attribute feature of the candidate POI, a relationship feature between the candidate POI and a positioning position of a user, a feature of a historical click rate of the candidate POI, or the like, or any combination thereof. In some embodiments, the self-attribute feature of the candidate POI may include a type of the candidate POI, a count of candidate PUPs recalled by the candidate POI, a hotness of the candidate POI, a count (number) of searched orders in a time period (e.g., 30 days, 60 days, 90 days), or the like, or any combination thereof. In some embodiments, the relationship feature between the candidate POI and the positioning position of the user may include a distance from the positioning position of the user to a center point of the candidate POI (i.e., a distance feature), whether the positioning position of the user and the center point of the candidate POI is in a same road section (i.e., a feature whether to cross a road), or the like, or any combination thereof. In some embodiments, the feature of the historical click rate of the candidate POI may include a count (number) of times (or frequencies) that the candidate POI is historically retrieved or clicked.

In 720, scoring values of the plurality of candidate POIs may be obtained by scoring the plurality of candidate POIs based on the first feature information. In some embodiments, operation 720 may be performed by the scoring value of candidate POI determination unit 432.

In some embodiments, the processing device may score the candidate POI through a POI recommendation model. For example, the scoring value of candidate POI determination unit 432 may obtain a likelihood scoring value of each candidate POI in the set of candidate POIs by inputting the extracted feature (e.g., the first feature information) of the candidate POI in the set of candidate POIs to the POI recommendation model.

In some embodiments, the likelihood scoring value (also referred to as "chosen probability") may indicate a probability that the candidate POI is selected by the user, such as a probability that each candidate POI is selected as a searched POI (or a PUP of an order) by the user. The higher the likelihood scoring value of the candidate POI (or candidate PUP), the higher the probability that the candidate POI may be used as the searched POI (or the PUP of the order) by the user. For example, if a likelihood scoring value of a candidate point A of interest is 0.4, a likelihood scoring value of a candidate point B of interest is 0.6, and a likelihood scoring value of a candidate point C of interest is 0.9, it may indicate that a probability that the candidate point C of interest is used as the searched POI by the user is largest.

In 730, a screened set of candidate POIs may be obtained by screening the plurality of candidate POIs based on similarity degrees between the plurality of candidate POIs. In some embodiments, operation 730 may be performed by the candidate POI screening unit 434.

In some embodiments, the candidate POI screening unit 434 may screen any two candidate POIs whose similarity degree is larger than a preset similarity degree threshold based on a similarity degree of any two candidate POIs in the set of candidate POIs. For example, if a similarity degree between a POI "Capital Space" and a POI "Capital Space Wanji Technology" is larger than the preset similarity degree threshold (e.g., 0.7), any one POI between "Capital Space" and "Capital Space Wanji Technology" (e.g., Capital Space) may be kept as a candidate interest point, and another candidate interest point (e.g., Capital Space Wanji Technology) may be screened out from the set of candidate POIs.

In some embodiments, the similarity degree of any two candidate POIs may be related to a name similarity degree of candidate POIs, a coordinate similarity degree of candidate POIs, an address similarity degree of candidate POIs, or the like, or any combination thereof. The similarity degree may refer to a degree of proximity of two or more types of information. In some embodiments, the recommended POI determination module 430 (e.g., the similarity degree of candidate POIs determination unit) may determine the name similarity degree of any two candidate POIs, and determine whether two candidate POIs are the same based on the name similarity degree of any two candidate POIs. Name similarity degree determination manners may include calculating a Jaccard similarity degree coefficient, a cosine similarity degree, a Manhattan distance, a Euclidean distance, a Ming style distance, an editing distance, or the like, or any combination thereof, of names of any two candidate POIs. For example, a text segmentation degree may be performed on the names of the candidate POIs, keyword information in the candidate POIs may be extracted, similarity degrees of keywords may be obtained by comparing the keyword information of any two candidate POIs, and the similarity degree of the names of any two candidate interest points may be determined by weighted fitting a similarity degree of each keyword. In some embodiments, the recommended POI determination module 430 (e.g., the similarity degree of candidate POIs determination unit) may determine the coordinate similarity degree of any two candidate POIs, and determine whether two candidate POIs are the same based on the coordinate similarity degree of any two candidate POIs. For example, a European distance of any two candidate points may be determined based on coordinates of any two candidate POIs, and the coordinate similarity degree of any two candidate POIs may be determined based on the European distance. In some embodiments, the recommended POI determination module 430 (e.g., the similarity degree of candidate POIs determination unit) may determine the address similarity degree of any two candidate POIs, and determine whether two candidate POIs are the same based on the address similarity degree of any two candidate POIs. For example, a text segmentation may be performed on addresses of any two candidate POIs, administrative region information, road name information, region number information, etc., in the addresses of any two candidate POIs may be extracted, a similarity degree of each component (e.g., the administrative region information, the road name information, the region number information, etc.) may be determined by comparing the administrative region information, the road name information, the region number information, etc., extracted from the addresses of any two candidate POIs, and the address similarity degree of any two candidate POIs may be determined by weighted fitting the similarity of each component.

In 740, a set of recommended POIs may be determined based on a scoring value of each of one or more candidate POIs in the screened set of candidate POIs. The set of recommended POIs may include at least one recommended POI.

In some embodiments, the recommended POI determination module 430 (e.g., the recommended POI determination unit) may obtain a sorting result by sorting the one or more candidate POIs in the screened set of candidate POIs based on the scoring values (e.g., the likelihood scoring value) of the one or more candidate POIs, and determine at least one candidate POI as the recommended POI based on the sorting result. In some embodiments, the recommended POI determination module 430 may determine the recommended POI based on a setting scoring value threshold. The setting scoring value threshold may be manually set or determined by experiments. In some embodiments, the setting scoring value threshold may be set to 0.6, 0.7, 0.8, 0.9, etc., which is not limited in the present disclosure. For example, when the setting scoring value threshold is set to 0.7, the recommended POI determination module 430 may determine candidate POIs each of whose likelihood scoring value is larger than or equal to 0.7 as the recommended POI. In some embodiments, the setting scoring value threshold may be adjusted according to different scenes and different goals. For example, if a positioning location when the user initiates a service request is frequently visited by the user, the setting scoring value threshold for determining the recommended POI may be increased. As another example, if the positioning location when the user initiates a service request is not frequently visited by the user, the setting scoring value threshold for determining the recommended POI may be decreased. In some embodiments, the recommended POI determination module 430 may also determine the top N (e.g., top 10) candidate POIs with the highest scoring value as the recommended POIs.

It should be noted that the description of the process 700 is merely for example and illustration, and not intended to limit the scope of the present disclosure. For those skilled in the art, various variations or modifications of the process 700 may be made under the teachings of the present disclosure. However, those variations and modifications do not depart from the scope of the present disclosure.

Figure 8:
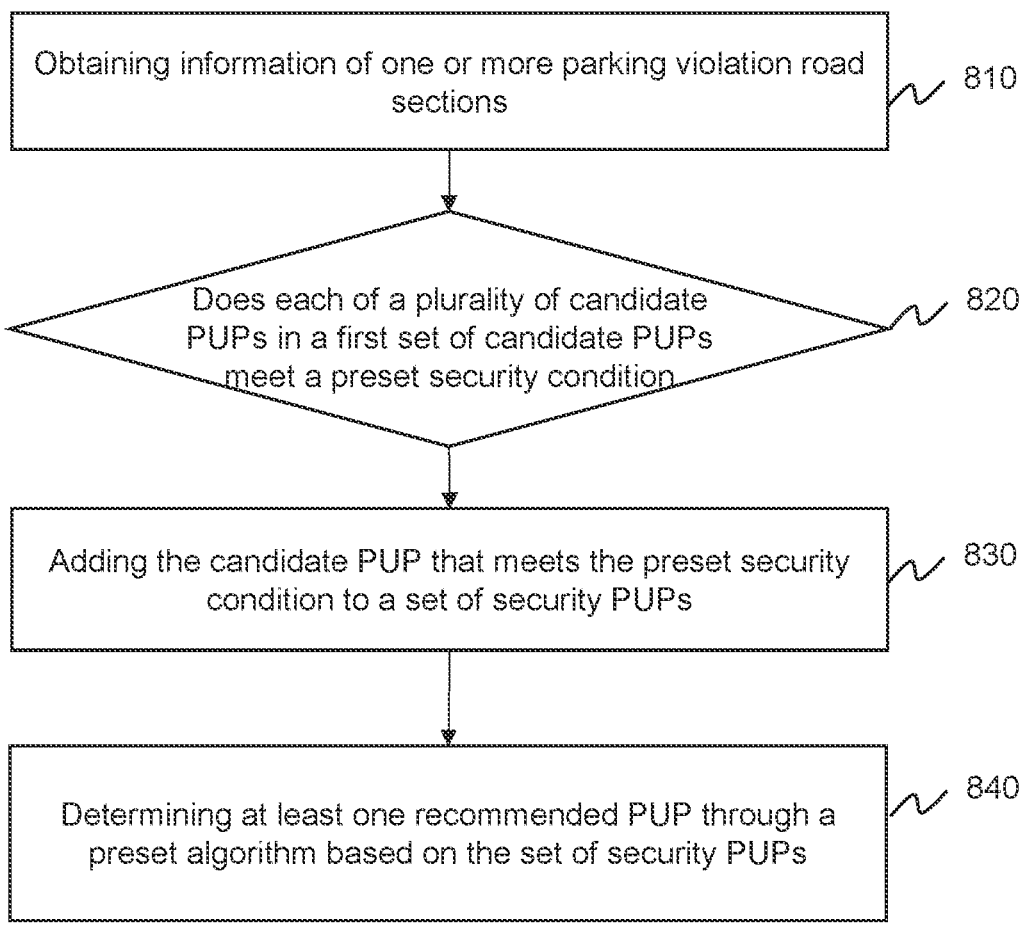
FIG. 8 is a flowchart illustrating an exemplary process for recommending a pick-up point according to some embodiments of the present disclosure.

FIG. 8 is a flowchart illustrating an exemplary process for recommending a pick-up point (PUP) according to some embodiments of the present disclosure.

In some embodiments, at least a portion of process 800 may be implemented on the computing device 200 as shown in FIG. 2 or on the mobile device 300 shown in FIG. 3. In some embodiments, one or more operations in the process 800 may be performed by the PUP recommendation system 100 as shown in FIG. 1. For example, one or more operations in the process 800 may be stored in the storage device 130 and/or a storage in a form of instructions, and retrieved and/or performed by a processing device (e.g., the processing device 112, the processor 210, or the CPU 340). In some embodiments, the instruction may be transmitted in a form of an electron current or electrical signal. In some embodiments, the process 800 may be accomplished with one or more additional operations not described and/or without one or more of the operations discussed. Additionally, the order in which the operations of the process 800 illustrated in FIG. 8 and described below is not intended to be limited.

As shown in FIG. 8, in some embodiments, the processing device may determine a set of security PUPs based on a first set of candidate PUPs, and determine at least one recommended PUP through a preset algorithm based on the set of security PUPs. Process 800 may include the following operations.

In 810, information of one or more parking violation road sections may be obtained. In some embodiments, operation

810 may be performed by the security PUP determination unit 444 or the obtaining module 410.

A parking violation road section may refer to a road section involving an event of parking violation. In some embodiments, the information of the one or more parking violation road sections may include information of a parking violation road section including a no-parking sign, information of a road section in a parking ticket, information of a parking violation road section acquired by a parking violation electronic eye, information of a no-parking (parking violation) road section reported by a user, or the like, or any combination thereof. In some embodiments, the no-parking sign may include a no-parking banker and a no-parking yellow line. In some embodiments, one or more driving images may be acquired by a driving recorder, and information of a road section including the no-parking banker and the no-parking yellow line may be obtained from the one or more driving images. In some embodiments, information of a parking ticket may be obtained from a traffic system, and the information of the one or more parking violation road sections may be obtained from the information of the parking ticket. In some embodiments, location information monitored by the electronic eye that acquires a parking violation behavior may be obtained, and the information of the road section acquired by the parking violation electronic eye may be obtained. In some embodiments, the information of the one or more parking violation road sections may include positioning information of a no-parking location, a road name of the no-parking location, a direction of a no-parking road, etc.

In 820, whether each of the plurality of candidate PUPs in the first set of candidate PUPs meets a preset security condition may be determined. In response to that one of the plurality of candidate PUPs in the first set of candidate PUPs meets the preset security condition, operation 830 may be performed, and the candidate PUP may be added to the set of security PUPs. In some embodiments, operations 820 and 830 may be performed by the security PUP determination unit 444.

In some embodiments, the preset security condition may include that a parking risk (i.e., a parking violation value) of the candidate PUP is less than a preset risk threshold. For example, the security PUP (i.e., the security candidate PUP) may include a PUP with a small parking risk to avoid a driver from picking up a passenger in the parking violation road section, which is convenient for the driver to order. In some embodiments, the parking risk may be a ratio of a count (number) of tickets related to the candidate PUP to a total count (number) of orders related to the candidate PUP within a time period (e.g., a first preset time threshold). For example, the total count (number) of orders where the candidate PUP is a starting point and the count (number) of tickets received in the orders may be obtained within the first preset time threshold, and the parking risk of the candidate PUP may be obtained based on a ratio of the count (number) of tickets and the total count (number) of orders where the candidate PUP is the starting point. If the ratio of the count (number) of tickets received at the candidate PUP and the total count (number) of orders related to the candidate PUP is larger, a probability that a ticket of parking violation is received at the candidate PUP may be larger, and the parking risk of the candidate PUP may be larger. If the probability that the ticket of parking violation is received at the candidate PUP is less, the candidate PUP may be safer. In some embodiments, the preset risk threshold may be a fixed value, or determined based on a rank of parking risk. For example, the first 20% of candidate PUPs in the rank of parking risk may be added to the set of security PUPs. Alternatively, the bottom 20% of candidate PUPs in the rank of parking risk may be added to the set of security PUPs.

In some embodiments, the information of the one or more parking violation road sections may be obtained first. When at least one location information (e.g., a searched POI determined by the user) in a current order is located in the parking violation road section, whether parking risks of a plurality of candidate PUPs (e.g., the first set of candidate PUPs) related to the current order at a current time are less than the preset risk threshold may be determined. One or more candidate PUPs each of whose parking risk is less than the preset risk threshold may be added to the set of security PUPs. In some embodiments, based on the at least one location information (e.g., the searched POI) in the current order, whether the location information is located in the parking violation road section may be determined. For example, whether a location is located in the parking violation road section may be determined based on positioning coordinates of the location. In some embodiments, when the at least one location information of the current order is located in the parking violation road section, the parking risks of the plurality of candidate PUPs related to the location information may be determined. One or more candidate PUPs each of whose parking risk is larger than or equal to the preset risk threshold may be removed. The one or more candidate PUPs each of whose parking risk is less than the preset risk threshold may be designated as the security PUP, and added to the set of security PUPs. For example, based on a service request sent by the user, location information of a PUP set by the user in a current service order may be obtained. A plurality of candidate PUPs may be determined based on the location information of the PUP, and whether the location is located at a parking violation road section may be determined based on the location information of the PUP set by the user. If the location is located at the parking violation road section, a parking risk of each of the plurality of candidate PUPs may be determined. One or more candidate PUPs with a low parking risk may be designated as the security PUP, and added to the set of security PUPs. Therefore, recommended PUPs for users may be determined based on the set of security PUPs to obtain one or more PUPs with low parking risk, so that a driver can pick up the user easily.

In some embodiments, the information of the one or more parking violation road sections may be obtained first. When the at least one location information in the current order is not located in the parking violation road section, a plurality of candidate PUPs related to the current order may be added to the set of security PUPs. For example, the location information of the PUP (e.g., the searched POI) set by the user in the current service order may be obtained. Whether the location is located at the parking violation road section may be determined based on the location information of the PUP set by the user in the current service order. If the PUP is not located in the parking violation road section, the location of the PUP may be safe. The PUP and the plurality of candidate PUPs related to the PUP may be determined as the security PUP, and added to the set of security PUPs.

In some embodiments, whether each candidate PUP is a security PUP may be further determined based on a current attribute of the candidate PUP at the current time. For example, some road sections may be allowed to park within a time period, and parking may not be allowed during other time periods. Alternatively, parking may be allowed in a working day, and may not be allowed in a non-working day. When determining whether each candidate PUP is a security PUP, a time factor may be added to determine whether each candidate PUP at the current time is a security PUP. In some embodiments, whether one candidate PUP at the current time is a security PUP may be determined based on time information in a historical parking violation ticket in a traffic system, time information in the information of the no-parking road section, time information in no-parking information reported by the user. For example, when it is determined whether one candidate PUP is safe, whether the PUP is received a parking violation ticket at the current time may be determined, a parking risk of one PUP at the current time may be determined based on the current time and the information of the one or more parking violation road sections, and whether the PUP is a security PUP at the current time may be determined based on the parking risk at the current time. As another example, if a parking risk of one candidate PUP is high, but the PUP is received no parking violation ticket at the current time, or the PUP can be determined to park at the current time based on time information of the one or more no-parking road sections, the parking risk of the candidate PUP at the current time may be determined to be little, and the candidate PUP at the current time may be determined as the security PUP.

In some embodiments, a parking risk of a candidate PUP in each time period may be obtained by segmenting a full-day time, so that whether the candidate PUP in a certain time is a security PUP can be determined quickly. For example, the full day may be segmented into several time periods, such as from 4:00 am to 7:00 am, from 8:00 am to 11:00 pm, from 12:00 am to 14:00 pm, from 14:00 pm to 20:00 pm, from 21:00 pm to 3:00 am, etc., and the parking risk of the candidate PUP in each time period may be determined. For instance, the parking risk of the candidate PUP in each time period may be obtained based on a ratio of a count (number) of parking violation tickets in historical traffic information in each time period to a total count (number) of orders where the candidate PUP is the starting point in each corresponding time period in historical orders.

In some embodiments, the parking risk of the candidate PUP in the current time may also be determined by establishing a model. For example, the parking risk of the candidate PUP in the current time may be determined by establishing a model or performing a machine learning to establish a model based on historical data such as road section information and time information in historical parking violation tickets, road section information and time information in information of no-parking road sections, road section information and time information in historically manually reporting information, etc. In some embodiments, the model may be updated periodically or irregularly, further increasing a computation accuracy. For example, if there is no historical parking violation ticket in the current time, the parking risk of the PUP may be low in the current time. However, recently parking violation tickets for the current time period may be received. The model may be updated, model parameters may be optimized, and the computation accuracy of the model may be improved by updating the historical data.

In 840, the at least one recommended PUP may be determined through a preset algorithm based on the set of security PUPs. In some embodiments, operation 840 may be performed by the recommended PUP determination module 450.

In some embodiments, feature information (e.g., second feature information) of the candidate PUPs in the set of security PUP may be obtained, and the at least one recommended PUP may be determined based on the feature information. For example, the candidate PUPs in the set of security PUP may be scored and sorted based on the second feature information of the candidate PUPs, and top candidate PUPs may be determined as the recommended PUP. For example, a relevance scoring value (or a likelihood scoring value) of each candidate PUP may be determined based on the feature information, such as, a distance between a preset PUP (the searched POI) set by the user in the order and the candidate PUP, a distance between the candidate PUP and a current positioning location of the user, a count (number) of times that the preset PUP is determined as the recommended PUP in a time period, a count (number) of times that the candidate PUP is determined as the recommended PUP in a time period, a sort of the candidate PUPs may be determined, and a top candidate PUP may be determined as the recommended PUP.

In some embodiments, the scoring values of the candidate PUPs may be determined by setting different weight values to different feature information. In some embodiments, the scoring values of the candidate PUPs may be determined by establishing a model or a function. In some embodiments, the scoring values of the candidate PUPs may be determined by training a PUP recommendation model using a machine learning, and the sort of the candidate PUPs may be obtained.

It should be noted that the description of the process 800 is merely for example and illustration, and not intended to limit the scope of the present disclosure. For those skilled in the art, various variations or modifications of the process 800 may be made under the teachings of the present disclosure. However, those variations and modifications do not depart from the scope of the present disclosure.

Figure 9:
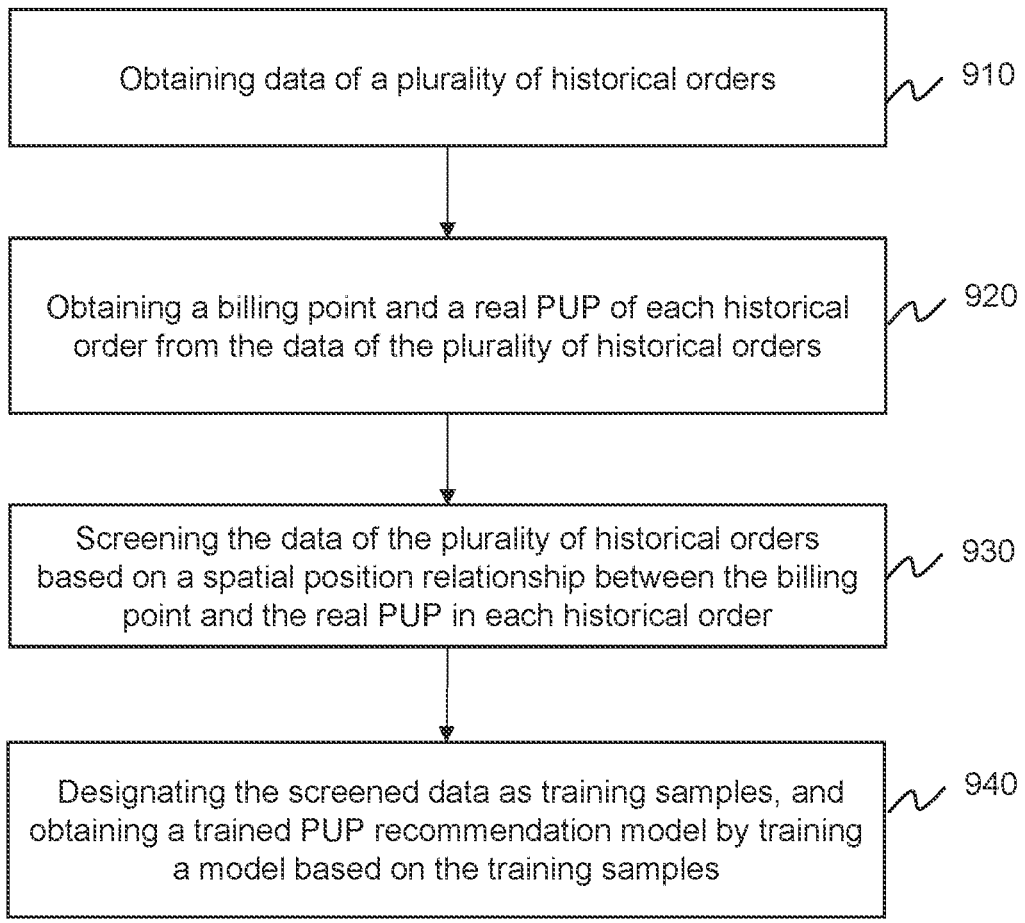
FIG. 9 is a flowchart illustrating an exemplary process for determining a pick-up point recommendation model according to some embodiments of the present disclosure.

FIG. 9 is a flowchart illustrating an exemplary process for determining a pick-up point (PUP) recommendation model according to some embodiments of the present disclosure.

In some embodiments, at least a portion of process 900 may be implemented on the computing device 200 as shown in FIG. 2 or on the mobile device 300 shown in FIG. 3. In some embodiments, one or more operations in the process 900 may be performed by the PUP recommendation system 100 as shown in FIG. 1. For example, one or more operations in the process 900 may be stored in the storage device 130 and/or a storage in a form of instructions, and retrieved and/or performed by a processing device (e.g., the processing device 112, the processor 210, or the CPU 340). In some embodiments, the instruction may be transmitted in a form of an electron current or electrical signal. In some embodiments, the process 900 may be accomplished with one or more additional operations not described and/or without one or more of the operations discussed. Additionally, the order in which the operations of the process 900 illustrated in FIG. 9 and described below is not intended to be limited.

In 910, data of a plurality of historical orders may be obtained. In some embodiments, operation 910 may be performed by the sample data obtaining unit 462.

In some embodiments, the sample data obtaining unit 462 may communicate with the server 110, the user terminal 120, and/or the storage device 130 to obtain the data of the plurality of historical orders. For example, the user terminal 120 may obtain sensing data (e.g., a real-time positioning point) and an operation content (e.g., an input searched point of interest (POI), a selected PUP) of a user, and perform data correlation with car-hailing orders via various sensors mounted on the user terminal. In some embodiments, a historical order may include a carpool order, a special car order, an express order, a windmill order, a taxi order, etc.

In some embodiments, the data of the plurality of historical orders may include information associated with historical car-hailing orders. The data of each of the plurality of historical orders may include a searched POI, a positioning position of the user, a candidate PUP, a recommended PUP, a real PUP, a billing point, an order trajectory, or the like, or any combination thereof. In some embodiments, the sample data obtaining unit 462 may obtain the data of the plurality of historical orders within a certain time period. For example, the data of the historical order may include orders within a year (e.g., last year, current year, most recent year), half a year (e.g., last half of the year, a first half of the year), a quarter year (e.g., last three months, a second quarter of the year), one month (e.g., last month), or the like, or any combination thereof.

In 920, a billing point and a real PUP of each historical order may be obtained from the data of the plurality of historical orders. In some embodiments, operation 920 may be performed by the sample data obtaining unit 462.

In some embodiments, the sample data obtaining unit 462 may obtain the billing point from each historical order. The billing point may indicate a location point of a vehicle when a driver clicks "Start Trip," "Start Billing," or other similar options set in a corresponding driver terminal when the driver arrives at a location of a passenger and picks up the passenger successfully. The billing point may be recorded by the driver terminal and performed the data correlation with the car-hailing orders.

In some embodiments, the sample data obtaining unit 462 may obtain a motion trajectory of the driver terminal and a motion trajectory of the passenger terminal in each historical order, and then determine, based on the motion trajectory of the driver terminal, at least one stopping point of the driver terminal. The stopping point of the driver terminal may be one of motion trajectory points of the driver terminal. In some embodiments, the sample data obtaining unit 462 may determine, based on the motion trajectory of the passenger terminal, at least one stopping point of the passenger terminal. The stopping point of the passenger terminal may be one of motion trajectory points of the passenger terminal. In some embodiments, the sample data obtaining unit 462 may determine the real PUP based on the at least one stopping point of the driver terminal and the at least one stopping point of the passenger terminal. The real PUP may indicate an actual location where the driver picks up the passenger, or where the passenger and the driver meet.

In some embodiments, the sample data obtaining unit 462 may determine whether a dwell time of the driver terminal at the motion trajectory point is larger than a second preset time threshold. If the dwell time of the driver terminal at the motion trajectory point is larger than the second preset time threshold, whether motion trajectory points within the second preset time threshold are available to be clustered may be further determined. If the motion trajectory points within the second preset time threshold are available to be clustered, the at least one stopping point of the driver terminal may be determined based on the clustered motion trajectory points of the driver terminal.

In some embodiments, the sample data obtaining unit 462 may determine whether a dwell time of the passenger terminal at the motion trajectory point is larger than a third preset time threshold. If the dwell time of the passenger terminal at the motion trajectory point is larger than the third preset time threshold, whether motion trajectory points within the third preset time threshold are available to be clustered may be further determined. If the motion trajectory points within the third preset time threshold are available to be clustered, the at least one stopping point of the passenger terminal may be determined based on the clustered motion trajectory points of the passenger terminal. In some embodiments, the preset time threshold corresponding to the dwell time of the driver terminal at the motion trajectory point may be the same or different from the preset time threshold corresponding to the dwell time of the passenger terminal at the motion trajectory point. For example, the preset time threshold corresponding to the dwell time of the driver terminal at the motion trajectory point and the preset time threshold corresponding to the dwell time of the passenger terminal at the motion trajectory point may be the second preset time threshold (or the third preset time threshold). In some embodiments, the second preset time threshold or the third preset time threshold may include a time period of an intersection generated by the motion trajectory of the driver terminal and the motion trajectory of the passenger terminal.

In some embodiments, the sample data obtaining unit 462 may obtain the time period of the intersection generated by the motion trajectory pints of the driver terminal and the motion trajectory pints of the passenger terminal. Then, the sample data obtaining unit 462 may determine a first distance between one intersection point among a plurality of intersection points (i.e., a set of first stopping points) between the motion trajectory pints of the driver terminal and the motion trajectory pints of the passenger terminal and the at least one stopping point of the driver terminal among the plurality of intersection points, and a second distance between the intersection point and the at least one stopping point of the passenger terminal. The sample data obtaining unit 462 may determine an intersection point of the plurality of intersection points the real PUP. The first distance and the second distance corresponding to the intersection point may be minimum. More descriptions regarding the obtaining the real PUP from each historical order may be found elsewhere in the present disclosure, for example, FIG. 10 and relevant descriptions thereof, which may not be repeated herein.

In some embodiments, the sample data obtaining unit 462 may directly obtain the billing point and the real PUP of the historical order from background data of the PUP recommendation system 100. Orders in the system background may include orders (e.g., running orders, just-completed orders, submitted orders, pending orders, etc.) that have been generated and saved in the system.

In 930, the data of the plurality of historical orders may be screened based on a spatial position relationship between the billing point and the real PUP in each historical order. In some embodiments, operation 930 may be performed by the training sample determination unit 464.

In some embodiments, the training sample determination unit 464 may determine the distance between the billing point and the real PUP in each historical order, and then screen the data of the plurality of historical orders based on the distance between the billing point and the real PUP in each historical order. If the distance between the billing point and the real PUP in each historical order is larger than a second preset distance threshold, the historical order may not pass the screening. For example, the distance between the billing point and the real PUP may be determined based on location information of the billing point and the real PUP in the historical order. If the distance (e.g., 30 meters) is larger than the second preset distance threshold, the historical order may not pass the screening, then the historical order may be used as a noise sample and may not be used in a training process of a PUP recommendation model. In some embodiments, the location information of the billing point and the real PUP may at least include latitude and longitude coordinates. In some embodiments, the distance may include a spherical distance or a straight distance. For example, if the distance between the billing point and the real PUP is 30 meters which is larger than the second preset distance threshold of 10 meters, it may indicate that the driver may click a button of "Start Trip" or "Start Billing" after the driver has successfully picked up the passenger and the vehicle has started driving, resulting in a spatial location offset between the billing point and the actual PUP of the passenger, or the driver may successfully pick up the passenger and click the button of "Start Trip" or "Start Billing" in time, but a GPS position of the billing point has drifted, resulting in a spatial location offset between the billing point uploaded to the server and the real PUP of the passenger.

In some embodiments, in respond to that the distance between the billing point and the real PUP in each historical order is not larger than the second preset distance threshold, the training sample determination unit 464 may screen the data of the plurality of historical orders based on whether the billing point and the real PUP in each historical order are in a same road section. If the billing point and the real PUP in each historical order are in the same road section, the historical order may pass the screening. For example, if the distance (e.g., 5 meters) between the billing point and the real PUP in the historical order is less than or equal to the second preset distance threshold (e.g., 10 meters), the training sample determination unit 464 may further determine whether the billing point and the real PUP in the historical order are in the same road section. If the billing point and the real PUP are in the same road section (e.g., both of the billing point and the real PUP are on a same side of the road), the historical order may pass the screening, and the historical order may be designated as the sample data to be used in the training process of the PUP recommendation model. If the billing point and the real PUP are not in the same road section (e.g., a cross-way between the billing point and the real PUP), the historical order may not pass the screening, then the historical order may be used as a noise sample and may not be used in the training process of the PUP recommendation model.

In 940, the screened data may be designated as training samples, and a trained PUP recommendation model may be obtained by training a model based on the training samples. In some embodiments, operation 940 may be performed by the model determination unit 466.

In some embodiments, for each historical order that passes the screening, the model determination unit 466 may obtain a searched POI and a PUP in each historical order, determine a feature of the searched POI and a feature of the PUP in each historical order, determine a label of the historical order based on a spatial position relationship between a recommended PUP and the real PUP of the historical order, and finally obtain the trained PUP recommendation model by training the model based on the feature of the searched POI and the feature of the PUP in the historical order and the label of the historical order.

In some embodiments, the model determination unit 466 may obtain the searched POI of each historical order. For example, the passenger may input one or more searched keywords to obtain a list of relevant POIs (or a list of recommended POIs), and then select one relevant POI from the list of relevant POIs as the searched POI. The list of relevant POIs may include at least one relevant POI. The relevant POI may be a location related to the searched POI. As another example, the passenger may select a POI as the searched POI by dragging an indicator (e.g., a big head pin) on a map based on the map on a user interface of the user terminal 120. Still another example, the searched POI may be automatically generated based on a positioning location of the passenger. For instance, if the positioning location of the passenger is "Riyueguang-Dinghao Building Block A," a POI may be automatically displayed to be "Auxiliary Road of North 4th Ring Road West/Shanyuan Street (Intersection) ."

In some embodiments, the model determination unit 466 may determine the feature of the searched POI and the feature of the PUP in each historical order. The PUP may include the real PUP or the recommended PUP. The feature of the searched POI may refer to feature information associated with the searched POI. The feature of the PUP may refer to feature information associated with the candidate PUP. In some embodiments, the feature of the searched POI may include a self-attribute feature of the searched POI, a relationship feature between the searched POI and the candidate PUP, or the like, or any combination thereof. The relationship feature between the searched POI and the candidate PUP may be determined based on location information of the searched POI and location information of the candidate PUP. The relationship feature may include a cross-way relationship feature (e.g., whether the searched POI and the candidate PUP are in a same road section) and a distance relationship feature (e.g., a distance from the searched POI to the candidate PUP). The self-attribute feature of the searched POI may include a count (number) of candidate PUPs recalled by the searched POI, a hotness of the searched POI, a count (number) of retrieval orders of the searched POI within a time period (e.g., 30 days, 60 days, 90 days), or the like, or any combination thereof. In some embodiments, the relationship feature between the searched POI and the candidate PUP may include a count (number) of times of picking up from the searched POI to the candidate PUP within a time period (e.g., 30 days, 60 days, 90 days), a percentage of the count (number) of times of picking up from the searched POI to the candidate PUP within the time period (e.g., 30 days, 60 days, 90 days), a count (number) of times of picking up at a same road section as a road section from the searched POI to the candidate PUP within the time period (e.g., 30 days, 60 days, 90 days), a percentage of the count (number) of times of picking up at the same road section as the road section from the searched POI to the candidate PUP within the time period (e.g., 30 days, 60 days, 90 days), or the like, or any combination thereof. In some embodiments, the feature of the PUP may include a self-attribute feature of the PUP, a relationship feature between the positioning location of the user and the candidate PUP, or the like, or any combination thereof. The self-attribute feature of the PUP may include a hotness of the PUP, a count (number) of orders of the candidate PUP within a time period (e.g., 30 days, 60 days, 90 days, 180 days), a median of offsets between the PUPs and the billing points in the orders within a time period (e.g., 30 days, 60 days, 90 days, 180 days), a fixing rate within 30 meters from the candidate PUP in the orders within a time period (e.g., 30 days, 60 days, 90 days, 180 days), or the like, or any combination thereof.

In some embodiments, the model determination unit 466 may determine the label of the historical order based on the spatial position relationship between the recommended PUP and the real PUP of the historical order. In some embodiments, the training samples may include positive samples and negative samples. A distance between the real PUP and the recommended PUP in the positive sample may be less than or equal to the second preset distance threshold (e.g., 30 meters), and a distance between the real PUP and the recommended PUP in the negative sample may be larger than the second preset distance threshold (e.g., 30 meters). The positive and negative samples may be identified with binary values, respectively. For example, the positive samples may be labeled as "1," and the negative samples may be labeled as "0."

It should be noted that the description of the process 900 is merely for example and illustration, and not intended to limit the scope of the present disclosure. For those skilled in the art, various variations or modifications of the process 900 may be made under the teachings of the present disclosure. However, those variations and modifications do not depart from the scope of the present disclosure.

Figure 10:
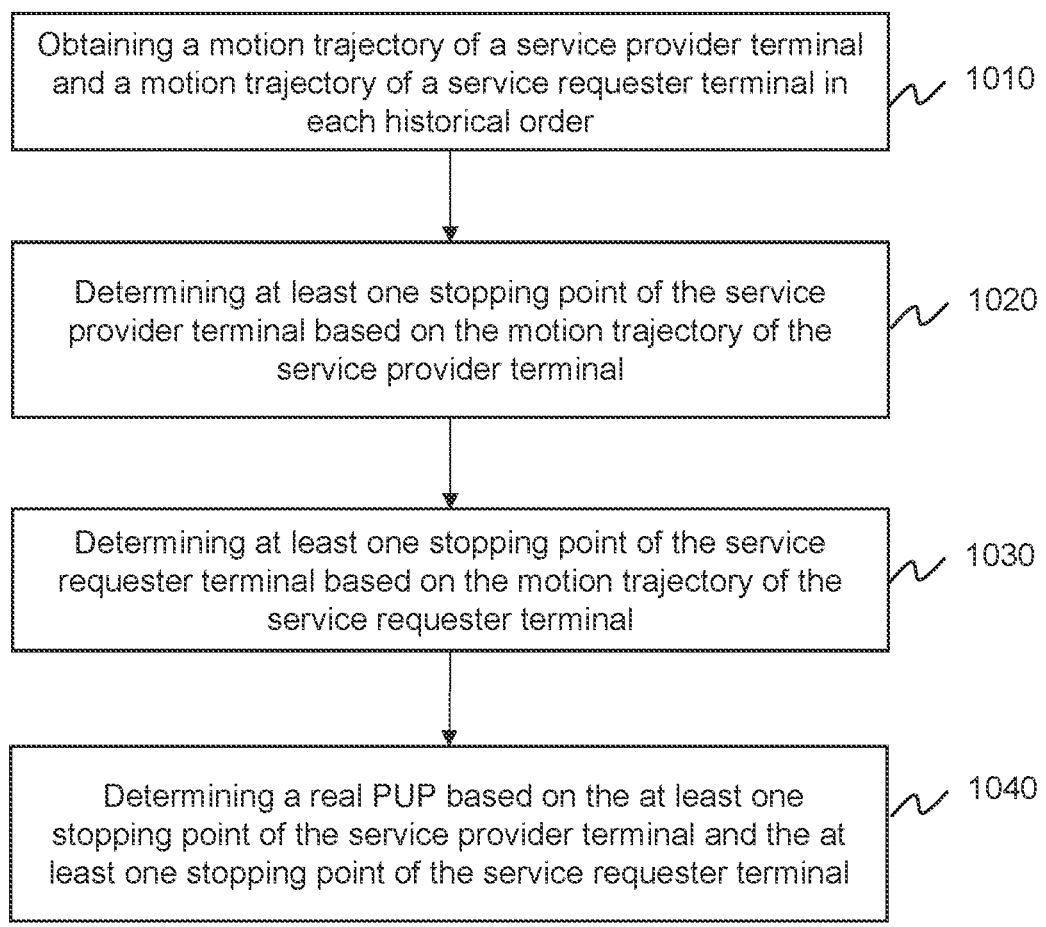
FIG. 10 is a flowchart illustrating an exemplary process for determining a pick-up point recommendation model according to some embodiments of the present disclosure.

FIG. 10 is a flowchart illustrating an exemplary process for determining a pick-up point (PUP) recommendation model according to some embodiments of the present disclosure.

In some embodiments, at least a portion of process 1000 may be implemented on the computing device 200 as shown in FIG. 2 or on the mobile device 300 shown in FIG. 3. In some embodiments, one or more operations in the process 1000 may be performed by the PUP recommendation system 100 as shown in FIG. 1. For example, one or more operations in the process 1000 may be stored in a storage device (e.g., the storage device 130 or a storage unit of the processing device) in a form of programs or instructions. When the processor 210, the CPU 340, or the modules (e.g., the training module 460) shown in FIG. 4 executes the programs or the instructions, the process 1000 may be implemented. In some embodiments, the instruction may be transmitted in a form of an electron current or electrical signal. In some embodiments, the process 1000 may be accomplished with one or more additional operations not described and/or without one or more of the operations discussed. Additionally, the order in which the operations of the process 1000 illustrated in FIG. 10 and described below is not intended to be limited.

In 1010, a motion trajectory of a service provider terminal and a motion trajectory of a service requester terminal in each historical order may be obtained.

In some embodiments, the processing device (e.g., a motion trajectory obtaining unit) may obtain a motion trajectory of a driver terminal (i.e., the service provider terminal) based on each historical order. The motion trajectory of the driver terminal may include a motion curve formed by fitting a plurality of location points of the driver terminal (or a vehicle) obtained at a certain preset frequency (e.g., 5 seconds/time, 10 seconds/time) through a positioning technique during a motion of a driver (or the vehicle). For instance, the location point may indicate a motion trajectory point of the driver terminal. For example, the motion trajectory of the driver terminal from a location that the driver of the driver terminal receives an order to a location that the driver picks up a passenger successfully may be obtained.

In some embodiments, the processing device (e.g., the motion trajectory obtaining unit) may obtain a motion trajectory of a passenger terminal (i.e., the service requester terminal) based on each historical order. The motion trajectory of the passenger terminal may include a motion curve formed by fitting a plurality of location points of the passenger terminal obtained at a certain preset frequency (e.g., 5 seconds/time, 10 seconds/time) through a positioning technique during a motion of a passenger. For instance, the location point may indicate a motion trajectory point of the passenger terminal. For example, the motion trajectory of the passenger terminal from a location that the passenger terminal initiates an order to a location that the driver picks up the passenger successfully may be obtained. The motion trajectory of the driver terminal and/or the motion trajectory of the passenger terminal may include location information, time information, speed information, or the like, or any combination thereof, of the driver terminal (or the vehicle) and/or the passenger terminal.

In 1020, at least one stopping point of the service provider terminal may be determined based on the motion trajectory of the service provider terminal. The stopping point of the service provider terminal may be one of the motion trajectory points of the service provider terminal.

In some embodiments, the stopping point may indicate a trajectory point that a target subject stays at a place for a time period. In some embodiments, the processing device (e.g., a stopping point of driver terminal determination unit) may determine whether a dwell time of the driver terminal at the motion trajectory point is larger than a second preset time threshold (e.g., 10 seconds, 20 seconds). If the dwell time (e.g., 25 seconds) of the driver terminal at the motion trajectory point is larger than the second preset time threshold (e.g., 10 seconds, 20 seconds), whether motion trajectory points within the second preset time threshold are available to be clustered may be further determined. If the motion trajectory points within the second preset time threshold are available to be clustered, the stopping point of the driver terminal may be determined based on the clustered motion trajectory points. The stopping point of the driver terminal may be one of the motion trajectory points of the driver terminal. In some embodiments, a clustering algorithm may be used to cluster the motion trajectory points each of whose dwell time of the driver terminal is larger than the second preset time threshold. In some embodiments, the clustering algorithm may be a density-based clustering algorithm, such as a density-based spatial clustering of applications with noise (DBSCAN) algorithm, a maximum density clustering application (MDCA) algorithm, an ordering points to identify the clustering structure (OPTICS) algorithm, a density clustering (DENCLUE) algorithm, or the like, or any combination thereof.

In 1030, at least one stopping point of the service requester terminal may be determined based on the motion trajectory of the service requester terminal. The stopping point of the service requester terminal may be one of the motion trajectory points of the service requester terminal.

In some embodiments, the processing device (e.g., a stopping point of passenger terminal determination unit) may determine whether a dwell time (e.g., 15 seconds) of the passenger terminal at the motion trajectory point is larger than a third preset time threshold (e.g., 5 seconds, 10 seconds). If the dwell time of the passenger terminal at the motion trajectory point is larger than the third preset time threshold, whether motion trajectory points within the third preset time threshold (e.g., 5 seconds, 10 seconds) are available to be clustered may be further determined. If the motion trajectory points within the third preset time threshold (e.g., 5 seconds, 10 seconds) are available to be clustered, the stopping point of the passenger terminal may be determined based on the clustered motion trajectory points. The stopping point of the passenger terminal may be one of the motion trajectory points of the passenger terminal. In some embodiments, a clustering algorithm may be used to cluster the motion trajectory points each of whose dwell time of the passenger terminal is larger than the third preset time threshold. In some embodiments, the clustering algorithm may be a density-based clustering algorithm, such as a density-based spatial clustering of applications with noise (DBSCAN) algorithm, a maximum density clustering application (MDCA) algorithm, an ordering points to identify the clustering structure (OPTICS) algorithm, a density clustering (DENCLUE) algorithm, or the like, or any combination thereof.

In some embodiments, the second preset time threshold may be the same as the third preset time threshold. For example, the second preset time threshold or the third preset time threshold may include a time period of an intersection generated by the motion trajectory of the driver terminal and the motion trajectory of the passenger terminal.

In 1040, a real PUP may be determined based on the at least one stopping point of the service provider terminal and the at least one stopping point of the service requester terminal.

In some embodiments, the processing device (e.g., the real PUP determination unit) may obtain a plurality of intersection points between the motion trajectory points of the service provider terminal and motion trajectory points of the service requester terminal, determine a first distance between one intersection point among the plurality of intersection points and the stopping point of the driver terminal and a second distance between the intersection point among the plurality of intersection points and the stopping point of the passenger terminal, and determine one intersection point of the plurality of intersection points be the real PUP. The first distance and the second distance corresponding to the intersection point may be minimum For example, intersection points between the motion trajectory points of the diver terminal and the motion trajectory points of the passenger terminal may include points M1, M2, and M3, the stopping points of the passenger terminal may include points C1, C2, C3, and C4, and the stopping points of the driver terminal may include points S1, S2, S3, and S4. If a first distance between point M2 and the stopping points of the driver terminal and a second distance between point M2 and the stopping points of the passenger terminal are the minimum, point M2 may be determined as the real PUP.

In some embodiments, the processing device may obtain the stopping points of the driver terminal and the stopping points of the passenger terminal within the time period of the intersection generated by the motion trajectory of the driver terminal and the motion trajectory of the passenger terminal, and add the stopping points to a set of first stopping points. A first distance between each stopping point in the set of first stopping points and the stopping points of the service provider terminal and a second distance between each stopping point in the set of first stopping points and the stopping points of the service requester terminal may be determined, and one first stopping point may be determined to be the real PUP, wherein the first distance and the second distance corresponding to the first stopping point are minimum.

It should be noted that the description of the process 1000 is merely for example and illustration, and not intended to limit the scope of the present disclosure. For those skilled in the art, various variations or modifications of the process 1000 may be made under the teachings of the present disclosure. However, those variations and modifications do not depart from the scope of the present disclosure.

Figure 11:
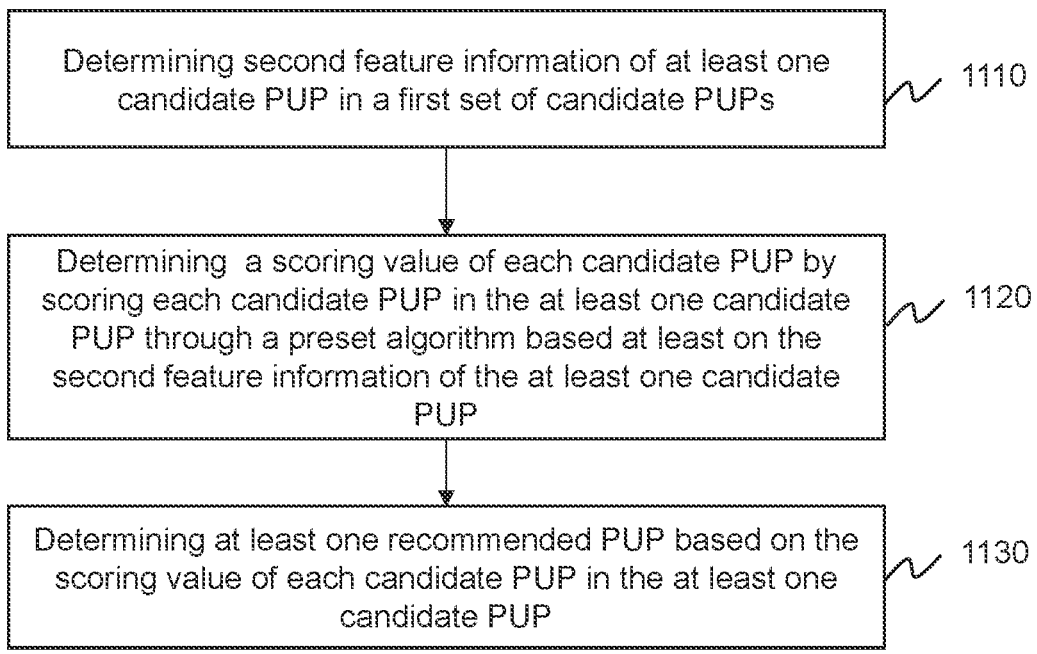
FIG. 11 is a flowchart illustrating an exemplary process for recommending a pick-up point according to some embodiments of the present disclosure.

FIG. 11 is a flowchart illustrating an exemplary process for recommending a pick-up point (PUP) according to some embodiments of the present disclosure.

In some embodiments, at least a portion of process 1100 may be implemented on the computing device 200 as shown in FIG. 2 or on the mobile device 300 shown in FIG. 3. In some embodiments, one or more operations in the process 1100 may be performed by the PUP recommendation system 100 as shown in FIG. 1. For example, one or more operations in the process 1100 may be stored in a storage device (e.g., the storage device 130 or a storage unit of the processing device) in a form of programs or instructions. When the processor 210, the CPU 340, or the modules (e.g., the recommended pick-up determination module 450) shown in FIG. 4 executes the programs or the instructions, the process 1100 may be implemented. In some embodiments, the instruction may be transmitted in a form of an electron current or electrical signal. In some embodiments, the process 1100 may be accomplished with one or more additional operations not described and/or without one or more of the operations discussed. Additionally, the order in which the operations of the process 1100 illustrated in FIG. 11 and described below is not intended to be limited.

In 1110, second feature information of at least one candidate PUP in a first set of candidate PUPs may be determined.

In some embodiments, the processing device may extract feature information (e.g., the second feature information) of each candidate PUP in the first set of candidate PUPs. In some embodiments, the processing device may determine a set of security PUPs based on the first set of candidate PUPs, and extract the second feature information of at least one candidate PUP in the set of security PUPs.

In 1120, a scoring value of each candidate PUP may be determined by scoring each candidate PUP in the at least one candidate PUP through the preset algorithm based at least on the second feature information of the at least one candidate PUP.

In some embodiments, the processing device may determine the scoring value of each candidate PUP by inputting the second feature information of the at least one candidate PUP to a trained recommended PUP model. For example, the scoring value (e.g., a relevance scoring value or a likelihood scoring value) of the candidate PUP may be determined by inputting the second feature information of the at least one candidate PUP in the set of security PUPs to the trained recommended PUP model.

In 1130, at least one recommended PUP may be determined based on the scoring value of each candidate PUP in the at least one candidate PUP.

In some embodiments, the processing device may obtain a sorting result by sorting the candidate PUPs based on the scoring value of each candidate PUP, and determine the at least one recommended PUP based on the sorting result. For example, the processing device may select candidate PUPs with top N (N is any positive integer) scoring values or a select candidate PUP with the first scoring value to be the recommended PUP. In some embodiments, the processing device may determine the sorting result of the candidate PUPs by inputting the second feature information of the candidate PUPs to the trained recommended PUP model, and determine the at least one recommended PUP based on the sorting result.

In some embodiments, the processing device may determine the at least one recommended PUP based on a scoring value threshold (e.g., 0.6, 0.7, 0.8, 0.9, etc.). For example, when the scoring value threshold is set to 0.7, the recommended PUP determination module 450 may determine candidate PUPs each of whose likelihood scoring value (or relevance scoring value) is larger than or equal to 0.7 as the recommended PUP.

In some embodiments, the processing device may obtain feature information of a searched POI, and determine the at least one recommended PUP based on the feature information of the searched POI and the feature information of the candidate PUP. For example, a correlation between the candidate PUP and the searched POI may be determined based on the feature information of the searched POI and the feature information of the candidate PUP, and candidate PUPs each of whose relevance scoring value is large or larger than the scoring value threshold may be determined as the recommended PUP.

In some embodiments, the processing device may display the determined recommended PUP to a user on a user terminal. For example, after the recommended PUP determination module 450 determines the recommended PUP, at least one location information set by the user may be updated to the recommended PUP in a current order, so that the user can take a ride based on the recommended PUP or the driver can pick up a passenger based on the recommended PUP.

It should be noted that the description of the process 1100 is merely for example and illustration, and not intended to limit the scope of the present disclosure. For those skilled in the art, various variations or modifications of the process 1100 may be made under the teachings of the present disclosure. However, those variations and modifications do not depart from the scope of the present disclosure.

The possible beneficial effects of the embodiments of the present disclosure may include but not limited to the following. (1) Recommending a suitable POI to a user based on features, such as location information of the user, historical behavior information, historical click rate of POIs, and name similarity degree, etc., can improve the efficiency and accuracy of recommended POI. (2) Recommending a PUP based on features, such as the historical behavior information of the user, a parking violation risk, etc., can meet personalized needs of the user and reduce an amount of parking violation tickets. (3) Determining training samples of a PUP recommendation model based on a spatial location relationship between a real PUP and a billing point can improve a convergence speed of the PUP recommendation model and the accuracy of the PUP recommendation. It should be noted that the beneficial effects that may be generated in different embodiments may be different in different embodiments, and the beneficial effects that may be generated may be any one or more of the above, or any other beneficial effect may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or features may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for recommending a pick-up point (PUP), comprising:
at least one storage medium including a set of instructions;
at least one processor in communication with the at least one storage medium, wherein executing the set of instructions, the at least one processor is directed to perform operations including:
obtaining information of a searched point of interest (POI) determined by a user;
determining a first set of candidate PUPs based at least on the information of the searched POI, the first set of candidate PUPs including a plurality of candidate PUPs;
determining at least one recommended PUP through a preset algorithm based at least on the first set of candidate PUPs, and displaying the at least one recommended PUP to the user;
wherein the determining at least one recommended PUP through a preset algorithm based at least on the first set of candidate PUPs includes:
determining a set of security PUPs based on the first set of candidate PUPs, wherein the set of security PUPs includes a PUP with a small parking risk to avoid a driver from picking up a passenger in the parking violation road section; and
determining the at least one recommended PUP through the preset algorithm based on the set of security PUPs.

2. The system of claim 1, wherein the searched POI includes one or more points of interest (POIs) selected by the user based on a set of recommended POIs; and
the determining a first set of candidate PUPs based at least on the information of the searched POI includes:
obtaining a positioning location of the user and historical behavior information of the user;
determining a set of candidate POIs based on the positioning location of the user and the historical behavior information of the user, the set of candidate POIs including a plurality of candidate POIs;
determining the set of recommended POIs based on the set of candidate POIs, the set of candidate POIs including at least one recommended POI; and
determining the first set of candidate PUPs based at least on the information of the searched POI selected by the user from the set of recommended POIs.

3. The system of claim 2, wherein the determining a set of candidate POIs based on the positioning location of the user and the historical behavior information of the user includes:
determining a set of first POIs including one or more first POIs within a preset range of the positioning location, a spatial distance between each of the one or more first POIs with the positioning location of the user being less than a first preset distance threshold;
determining, based on the historical behavior information of the user, a set of second POIs including one or more second POIs that are historically clicked and/or searched by the user; and
determining the set of candidate POIs based on the set of first POIs and the set of second POIs.

4. The system of claim 2, wherein the determining the set of recommended POIs based on the set of candidate POIs includes:
obtaining first feature information of the plurality of candidate POIs;
obtaining scoring values of the plurality of candidate POIs by scoring the plurality of candidate POIs based on the first feature information;
obtaining a screened set of candidate POIs by screening the plurality of candidate POIs based on similarity degrees between the plurality of candidate POIs; and
determining the set of recommended POIs based on a scoring value of each of one or more candidate POIs in the screened set of candidate POIs.

5. The system of claim 4, wherein the first feature information of a candidate POI includes at least one of a self-attribute feature of the candidate POI, a relationship feature between the candidate POI and the positioning position of the user, or a feature of a historical click rate of the candidate POI; wherein
the self-attribute feature of the candidate POI includes at least one of a type of the candidate POI, a count of candidate PUPs recalled by the candidate POI, or a hotness of the candidate POI; and
the relationship feature between the candidate POI and the positioning location of the user includes at least one of a distance feature or a feature whether to cross a road.

6. The system of claim 4, wherein the determining the set of recommended POIs based on a scoring value of each of one or more candidate POIs in the screened set of candidate POIs includes:
obtaining a sorting result by sorting the one or more candidate POIs in the screened set of candidate POIs based on the scoring value of each of the one or more candidate POIs; and
determining the set of recommended POIs based on the sorting result.

7. The system of claim 1, wherein
the set of security PUPs including at least one security candidate PUP.

8. The system of claim 1, wherein the determining a set of security PUPs based on the first set of candidate PUPs includes:
obtaining information of one or more parking violation road sections;
determining, based on the information of the one or more parking violation road sections, whether each of the plurality of candidate PUPs in the first set of candidate PUPs meets a preset security condition; and
adding one or more candidate PUPs each of which meets the preset security condition to the set of security PUPs.

9. The system of claim 8, wherein the preset security condition includes a condition that a parking risk value of the candidate PUP is less than a preset risk threshold; wherein
the parking risk value is a ratio of a count of tickets in orders where the candidate PUP is a starting point to a total count of the orders within a first preset time threshold.

10. The system of claim 1, wherein the determining the at least one recommended PUP through the preset algorithm based on the set of security PUPs includes:
obtaining second feature information of the at least one candidate PUPs in the set of security PUPs; and
determining the at least one recommended PUP through the preset algorithm based on the second feature information.

11. The system of claim 1, wherein the preset algorithm includes a trained PUP recommendation model.

12. The method of claim 11, wherein the trained PUP recommendation model is obtained according to a following process including:
obtaining data of a plurality of historical orders;
obtaining, from the data of the plurality of historical orders, a billing point and a real PUP of each historical order in the plurality of historical orders;
screening the data of the plurality of historical orders based on a spatial position relationship between the billing point and the real PUP of each historical order;
designating the screened data as training samples; and
obtaining the trained PUP recommendation model by training a model based on the training samples.

13. The system of claim 12, wherein the obtaining a billing point and a real PUP of each historical order from the data of the plurality of historical orders includes:
obtaining a motion trajectory of a service provider terminal and a motion trajectory of a service requester terminal in each historical order;
determining, based on the motion trajectory of the service provider terminal, at least one stopping point of the service provider terminal;
determining, based on the motion trajectory of the service requester terminal, at least one stopping point of the service requester terminal; and
determining the real PUP based on the at least one stopping point of the service provider terminal and the at least one stopping point of the service requester terminal.

14. The system of claim 13, wherein the determining, based on the motion trajectory of the service requester terminal, at least one stopping point of the service requester terminal includes:
determining, based on the motion trajectory of the service requester terminal, whether a dwell time of the service requester terminal at a motion trajectory point is larger than a second preset time threshold;
in response to that the dwell time of the service requester terminal at the motion trajectory point is larger than the second preset time threshold, determining whether motion trajectory points within the second preset time threshold are available to be clustered; and
in response to that the motion trajectory points within the second preset time threshold are available to be clustered, determining the at least one stopping point of the service requester terminal based on the clustered motion trajectory points of the service requester terminal.

15. The system of claim 14, wherein the determining the real PUP based on the at least one stopping point of the service provider terminal and the at least one stopping point of the service requester terminal includes:
obtaining a plurality of intersection points between the motion trajectory points of the service provider terminal and motion trajectory points of the service requester terminal;
determining a first distance between one intersection point among the plurality of intersection points and the at least one stopping point of the service provider terminal, and determining a second distance between the intersection point and the at least one stopping point of the service requester terminal; and
determining an intersection point of the plurality of intersection points to be the real PUP, the first distance and the second distance corresponding to the intersection point being minimum.

16. The system of claim 12, wherein the screening the data of the plurality of historical orders based on a spatial position relationship between the billing point and the real PUP in each historical order includes:
determining a distance between the billing point and the real PUP in each historical order;
in response to the distance between the billing point and the real PUP in the historical order is less than or equal to a second preset distance threshold, determining whether the billing point and the real PUP in the historical order are located in a same road section; and in response to that the billing point and the real PUP in the historical order are located in the same road section, determining that the historical order passes the screening.

17. The system of claim 12, wherein the designating the screened data as training samples; and obtaining the trained PUP recommendation model by training a model based on the training samples includes:
for each historical order that passes the screening,
obtaining a searched POI and a PUP in the historical order;
determining a feature of the searched POI and a feature of the PUP in the historical order;
determining a label of the historical order based on a spatial position relationship between a recommended PUP and the real PUP of the historical order; and
obtaining the trained PUP recommendation model by training, based on the feature of the searched POI and the feature of the PUP in the historical order and the label of the historical order, an initial machine learning model.

18. The system of claim 1, wherein the determining at least one recommended PUP through a preset algorithm based at least on the first set of candidate PUPs includes:
determining second feature information of at least one candidate PUP in the first set of candidate PUPs;
determining a scoring value of each candidate PUP by scoring each candidate PUP in the at least one candidate PUP through the preset algorithm based at least on the second feature information of the at least one candidate PUP; and
determining the at least one recommended PUP based on the scoring value of each candidate PUP in the at least one candidate PUP.

19. A method for recommending a pick-up point (PUP) implemented by a computer device including at least one processor and a storage device, comprising:
obtaining information of a searched point of interest (POI) determined by a user;
determining a first set of candidate PUPs based at least on the information of the searched POI, the first set of candidate PUPs including a plurality of candidate PUPs;
determining at least one recommended PUP through a preset algorithm based at least on the first set of candidate PUPs, and displaying the at least one recommended PUP to the user;
wherein the determining at least one recommended PUP through a preset algorithm based at least on the first set of candidate PUPs includes:
determining a set of security PUPs based on the first set of candidate PUPs, wherein the set of security PUPs includes a PUP with a small parking risk to avoid a driver from picking up a passenger in the parking violation road section; and
determining the at least one recommended PUP through the preset algorithm based on the set of security PUPs.

20. A non-transitory computer readable storage medium, comprising computer instructions that, when executed by at least one processor, direct the at least one processor to perform methods including:
obtaining information of a searched point of interest (POI) determined by a user;
determining a first set of candidate PUPs based at least on the information of the searched POI, the first set of candidate PUPs including a plurality of candidate PUPs;
determining at least one recommended PUP through a preset algorithm based at least on the first set of candidate PUPs, and displaying the at least one recommended PUP to the user;
wherein the determining at least one recommended PUP through a preset algorithm based at least on the first set of candidate PUPs includes:
determining a set of security PUPs based on the first set of candidate PUPS, wherein the set of security PUPs includes a PUP with a small parking risk to avoid a driver from picking up a passenger in the parking violation road section; and
determining the at least one recommended PUP through the preset algorithm based on the set of security PUPs.

* * * * *